United States Patent [19]
Clack et al.

[11] Patent Number: 6,051,144
[45] Date of Patent: Apr. 18, 2000

[54] LIQUID FILTRATION SYSTEM AND REPLACEABLE FILTER CARTRIDGE USABLE THEREWITH

[75] Inventors: Robert A. Clack, Sun Prairie; Melvin R. Hemp, Lodi; Richard E. Clack, Windsor, all of Wis.; W. Roger McPherson, Otsego, Mich.

[73] Assignee: Clack Corporation, Windsor, Wis.

[21] Appl. No.: 09/031,180

[22] Filed: Feb. 26, 1998

Related U.S. Application Data

[63] Continuation-in-part of application No. 08/820,139, Mar. 19, 1997, Pat. No. 5,876,610.

[51] Int. Cl.$^7$ .............................. B01D 17/12; B01D 35/43
[52] U.S. Cl. .............................. 210/739; 96/417; 210/87; 210/91; 210/100; 73/861.77
[58] Field of Search ........................ 96/417, 423; 210/85, 210/87–89, 91, 94, 100, 103, 138, 143, 282, 440, 443, 449, 266, 739, 746; 200/81.9 M; 73/861.77, 861.79, 861.87

[56] References Cited

U.S. PATENT DOCUMENTS

| | | |
|---|---|---|
| 3,053,087 | 9/1962 | Waugh . |
| 5,089,144 | 2/1992 | Ozkahyaoglu et al. ................... 210/87 |
| 5,099,699 | 3/1992 | Kobold ................................ 73/861.77 |
| 5,192,424 | 3/1993 | Beyne et al. ............................... 210/91 |
| 5,236,578 | 8/1993 | Oleskow et al. .......................... 210/87 |
| 5,536,395 | 7/1996 | Kuennen et al. .......................... 210/87 |
| 5,540,107 | 7/1996 | Silverman et al. ....................... 210/87 |
| 5,622,618 | 4/1997 | Brane et al. ............................... 210/87 |
| 5,628,895 | 5/1997 | Zucholl .................................... 210/91 |
| 5,674,381 | 10/1997 | Den Decker ............................. 210/85 |
| 5,823,229 | 10/1998 | Bertrand et al. ........................ 210/449 |

*Primary Examiner*—Joseph W. Drodge
*Attorney, Agent, or Firm*—Nilles & Nilles

[57] ABSTRACT

A filter cartridge is capable of at least one-way communication with the base of a filtration system so as to confirm that the filter cartridge is properly configured for installation and use in the filtration system. Transmission and receipt of a filter presence confirmation signal can enhance the effectiveness of the filtration system, e.g., by disabling one or more operational characteristics of the system in the absence of a confirmation signal, and/or by automatically resetting one or more counters of a capacity indicator of the system upon receipt of the confirmation signal. The filter cartridge is particularly well-adapted for use in a filtration system having a flow meter which monitors the flow of liquid through the system. In this case, the filter cartridge is operative to transmit signals to a detector on the associated base, and the operation of the flow meter and of the associated capacity indicator vary depending upon whether or not a filter presence confirmation signal is acquired by the detector.

56 Claims, 20 Drawing Sheets

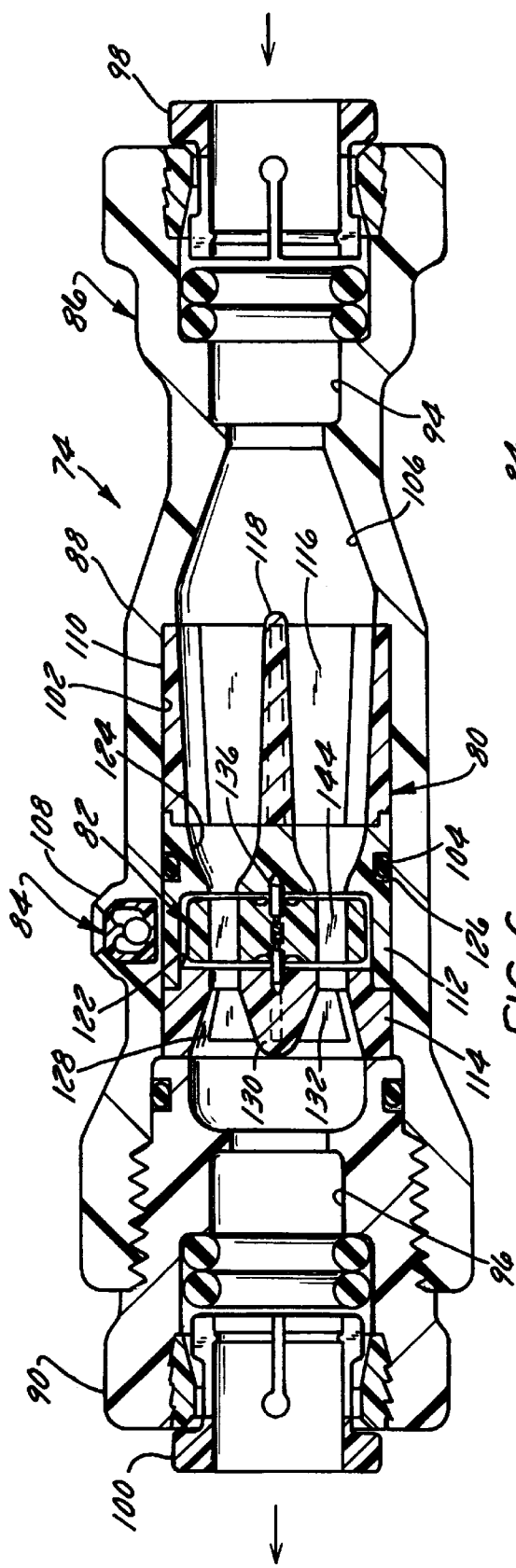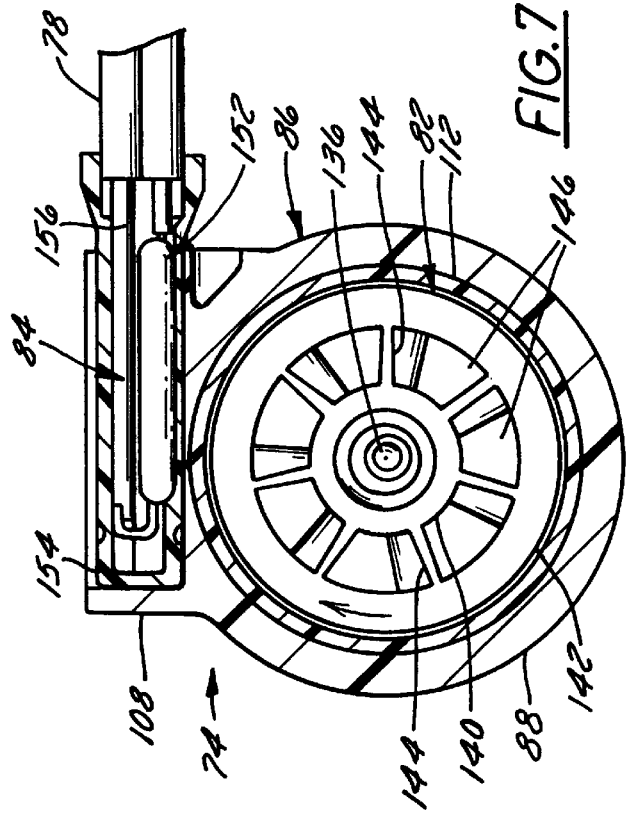

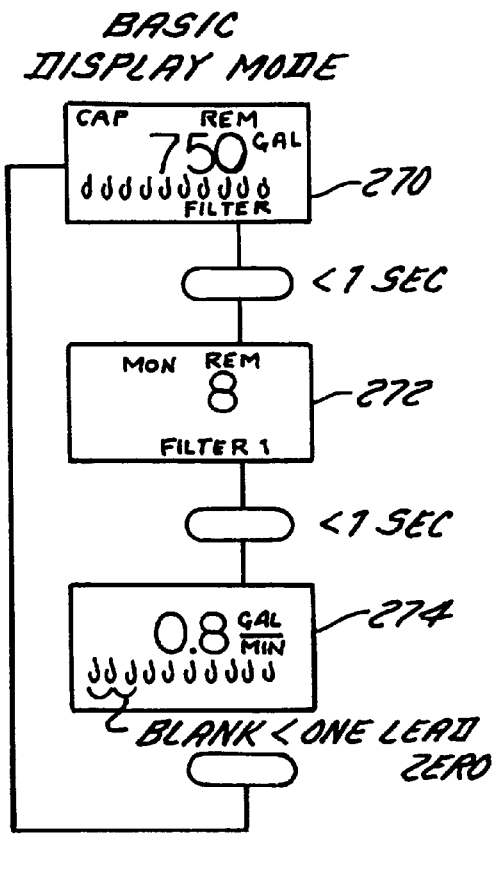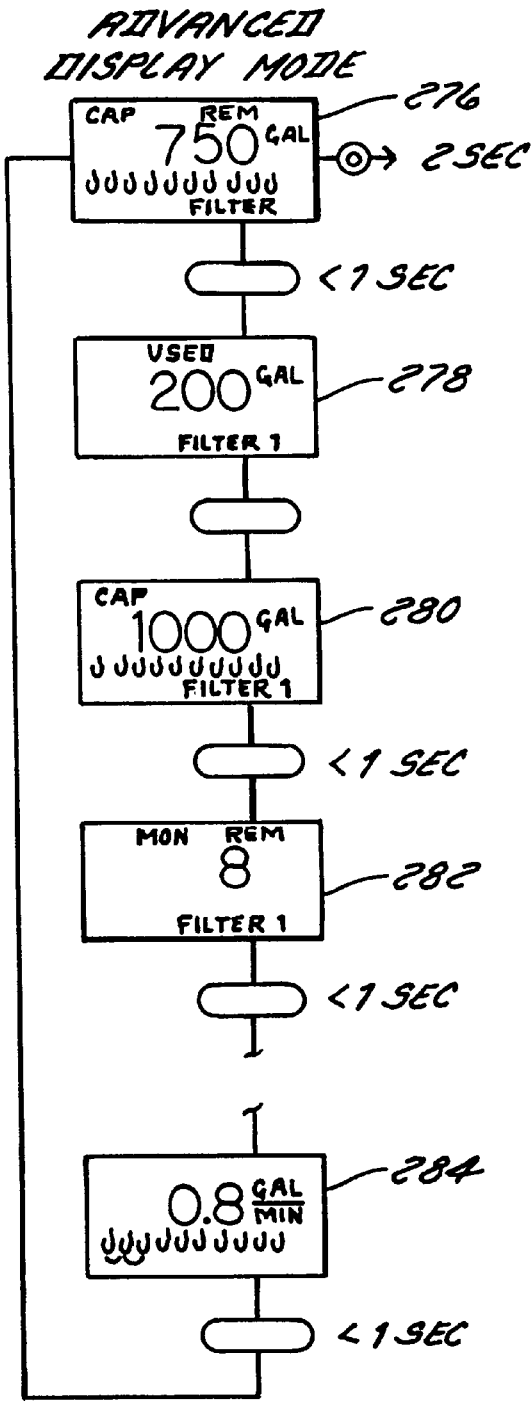
FIG. 22

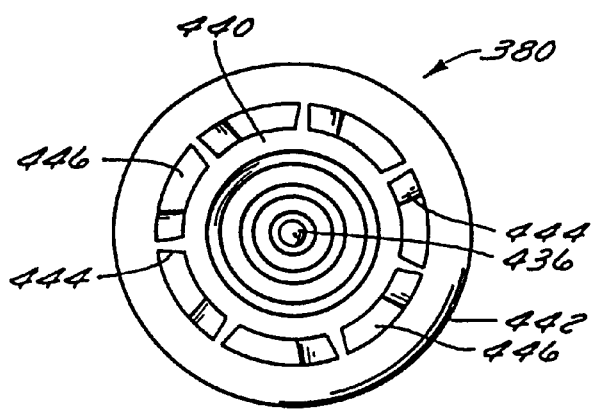
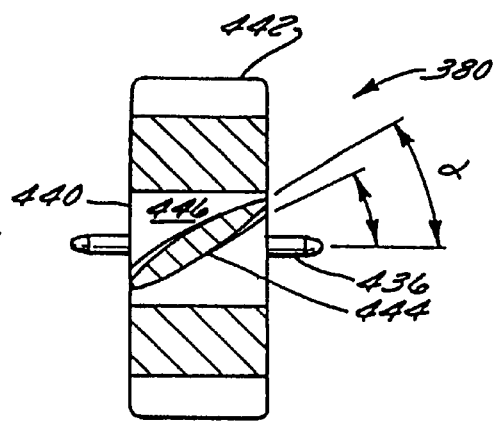
FIG. 27      FIG. 28
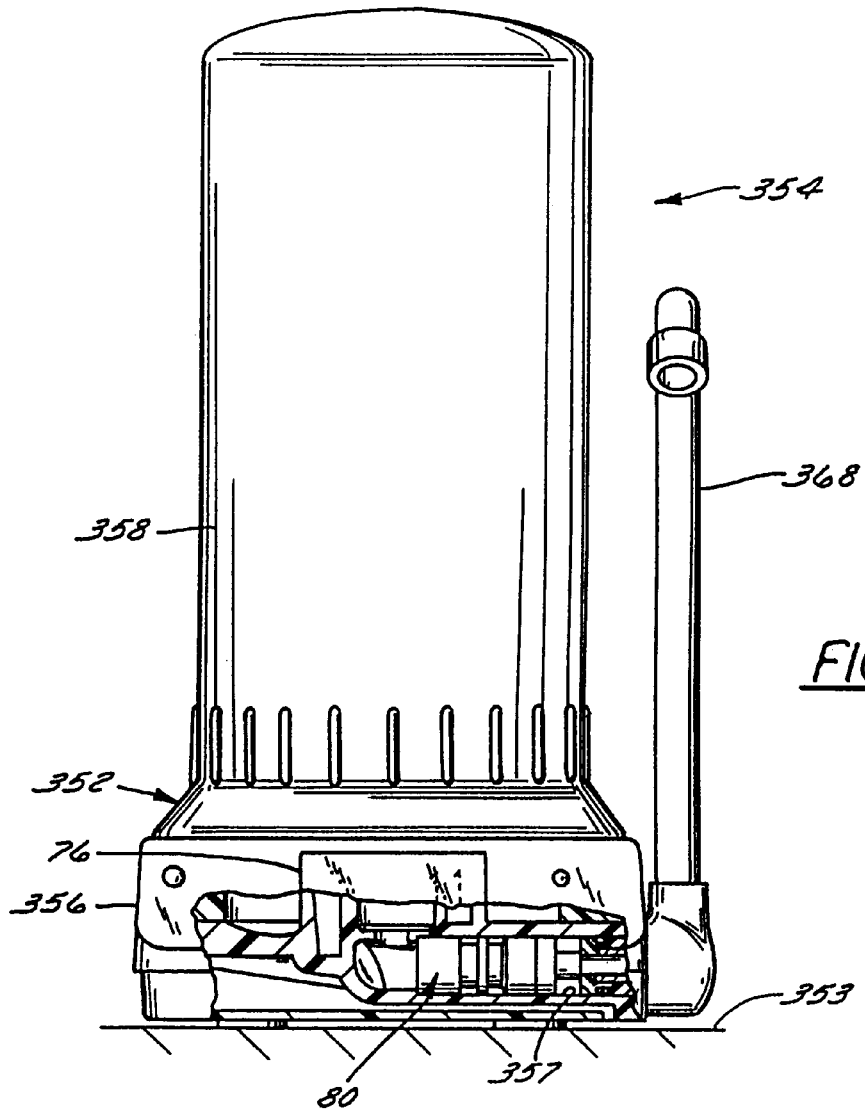
FIG. 26

LIQUID FILTRATION SYSTEM AND REPLACEABLE FILTER CARTRIDGE USABLE THEREWITH

CROSS REFERENCE TO A RELATED APPLICATION

This application is a continuation-in-part of commonly-assigned and co-pending U.S. patent application Ser. No. 08/820,139, filed Mar. 19, 1997, now U.S. Pat. No. 5,876,610, and entitled Method and Apparatus for Monitoring Liquid Flow Through an Enclosed Stream.

BACKGROUND OF THE INVENTION

1. Field of the Invention

The invention relates to liquid filtration systems and, more particularly, relates to a liquid filtration capable of ascertaining whether or not a properly-configured filter cartridge is installed in the system. The invention additionally relates to a replaceable filter cartridge which is usable in such a system and which transmits a filter cartridge presence confirmation signal.

2. Discussion of the Related Art

Reliable liquid flow measurement is important in many applications including the beverage handling industry, the pharmaceutical industry, the photo-processing industry, and many different liquid filtration industries. One example is the domestic or household potable water filtration industry in which replaceable filter cartridges are used to treat or purify water prior to its use. Typical filter cartridges have a rated useful life in terms of their volumetric capacity. That is, the filtration effectiveness of the carbon block or other filtration media of such cartridges decreases as the aggregate volume of treated water increases. Typical filter cartridges have a rated life of 500 gallons to 2000 gallons. Failure to replace filter cartridges at the end of their rated lives may result in reduction of treated water quality. Knowing or even estimating the time at which that a filter cartridge's volumetric capacity is reached can be difficult in most households because several different people use different amounts of water without informing one another of the volumes of water used by each.

The need therefore exists to monitor volumetric liquid flow through systems or possibly other parameters relating to liquid flow such as flow rate, and this need is especially evident with respect to the flow of water through a domestic or household type potable water filtration system. However, commercially-acceptably liquid flow meters heretofore have been unavailable for several reasons. First, flow meters tended to be relatively expensive. Second, they have tended to be relatively bulky and difficult to incorporate into existing filtration system designs. Third, and most importantly from the standpoint of regulatory agencies and others who demand accurate flow measurement through relatively wide ranges of source pressures and liquid flow rates, they must be accurate. However, accurate volumetric flow measurement over relatively wide ranges of source flow rates is a difficult task, particularly at medium to low flow rates of 1 gallon per minute or less and is especially difficult at low flow rates of 0.4 gallons per minute or less.

One attempt to design a flow monitor that meets at least some of the criteria described above is disclosed in U.S. Pat. No. 5,540,107 to Silverman et al. (the Silverman patent). The flow meter or flow monitor disclosed in the Silverman patent monitors rotation of a paddle wheel. Specifically, it counts paddle wheel revolutions, then determines aggregate volumetric liquid flow based upon precalibrated data representative of volumetric flow per pulse. This data is used in conjunction with a pre-stored rated volumetric filter cartridge capacity to provide an indication that the filter cartridge associated with the flow monitor requires replacement when the cartridge's volumetric capacity is reached.

The flow monitor of the Silverman patent attempts to minimize pressure drop through an acceptable range of operating flow rates. It includes a housing presenting an impeller chamber in which is disposed an impeller or paddle wheel that essentially acts as a paddle wheel. That is, water enters the impeller chamber peripherally at a first portion, engages the fins or vanes of the paddle wheel to drive the paddle wheel to rotate as the water flows through the impeller chamber, and then exists the impeller chamber radially or at least peripherally at another location. A magnet is inserted into the paddle wheel, and a sensor having an induction coil and a flux concentrator is disposed adjacent the paddle wheel so that the sensor counts two pulses with each rotation of the paddle wheel. The counted pulses can then be used to determine volumetric liquid flow.

The flow meter disclosed in the Silverman patent exhibits several drawbacks and disadvantages.

For instance, both its paddle wheel design and its associated detector require significant torque to move or drive the paddle wheel. Significant torque is required to drive the paddle wheel because the paddle wheel presents significant resistance to the generally peripheral flow of water therethrough. Additional resistance to liquid flow through the paddle wheel occurs because the paddle wheel floats in the paddle wheel chamber and is only loosely or roughly supported. The discrete magnets and induction coil-type detector also provide significant resistance to paddle wheel movement. If left uncompensated for, the pressure drops resulting from these resistances would reduce the liquid flow rate through the flow meter by an unacceptable magnitude.

The Silverman patent was cognizant of the need to minimize pressure drops and, hence, designed features into its flow meter to reduce back pressure. Most notably, it provides a tapered inlet nozzle which directs liquid into the impeller chamber at a direction tangent to the fins or blades of the paddle wheel to increase liquid flow rates. However, by converting the potential energy of the flowing liquid to kinetic energy by accelerating the liquid prior to its entry into the paddle wheel, Silverman's nozzle necessarily increases pressure drop in its flow meter. Moreover, in order to permit the tapered nozzle to operate effectively, an inlet plenum or reservoir must be formed in the housing upstream of the nozzle. Provision of the nozzle and the plenum necessarily complicates the flow meter design and proves only partially effective in reducing pressure drop. In addition, the overall design has a somewhat limited range of linearity (i.e., a flow rate range in which a uniform number of pulses are counted for each gallon of liquid flowing through the meter).

The Silverman patent also recognizes that problems are associated with the use of a discrete magnet and states that it would be preferable to have the paddle wheel as a whole magnetic. However, Silverman considered regulatory constraints on materials, an insurmountable obstacle to this task. (It is believed that the regulatory constraints referenced in the Silverman patent are those that would prohibit the use of a paddle wheel in which materials from the magnet leach or are washed into the water.) These problems are exacerbated by Silverman's paddle-wheel design because Silverman's paddle wheel lacks bearings. Therefore, friction between the magnetic paddle wheel and its support tend to abrade the paddle wheel and cause some of the magnetic materials to rub off into the treated water stream. The Silverman patent therefore requires that the magnet be a separate insert imbedded in the paddle wheel.

In addition, the complexity of the flow meter disclosed in the Silverman patent renders it unduly bulky for many applications. It simply cannot be worked into many existing filter assembly designs without significantly modifying the assembly's design.

Moreover, the configuration of the paddle wheel magnet and the induction coil-type detector impose power restraints on the system that require the use of an external AC power source and an AC to DC converter if the flow meter is to be used to monitor liquids flowing at more than 3 gallons per minute. These power restraints limit the practical applicability of the flow meter disclosed in the Silverman patent to applications in which liquids flowing at less than three gallons per minute are monitored.

Another problem associated with many filtration systems, and even filtration systems having flow monitors and capacity indicators, is that they cannot assure that a spent filter cartridge will be replaced with one properly designed or configured for use in the filtration system or is in place at all. Filter assemblies of most filtration systems will accept any replacement filter cartridge that is of generally the same dimensions as the spent cartridge and that has a post or other coupling member capable of sealingly engaging the mating socket or other coupling member of the base or head of the filter assembly. This design is advantageous to the extent that it permits the use of semi-universal cartridge-to-base configurations. However, this design is disadvantageous to the extent that it cannot guarantee the replacement of a spent filter cartridge with a replacement filter cartridge having the same or generally the same filtration characteristics as the spent cartridge. Hence, a filter cartridge having a granulated carbon filtration medium could be replaced by a filter cartridge having a membranous filtration medium with a resultant change in filtration capability. Similarly, a filter cartridge having a relatively high filtration capacity of, e.g., 2,000 gallons could be replaced by a similarly-dimensioned filter cartridge having a lower capacity of, e.g., 1,000 gallons. If the associated liquid filtration system has a flow meter that generates and displays a REPLACE CARTRIDGE or similar signal only when the 2,000 gallon filtration limit is approached, the REPLACE CARTRIDGE signal will not be generated or displayed until well after the replacement cartridge is actually spent. The need has therefore arisen to provide a filter cartridge for a filter assembly that is capable of providing an indication that the filter cartridge is properly configured for use with that filter assembly.

Another problem associated with filter cartridge replacement in filtration systems having flow monitors is the need for manual reset. That is, a flow monitor may have one or more counters permitting the calculation and/or display of information concerning the aggregate volume of product that has been treated since cartridge installation, the elapsed time since cartridge installation, etc. If the flow monitor is to operate properly, the counter(s) must be reset upon each proper cartridge replacement operation. It would be advantageous if this reset were to occur automatically.

OBJECTS AND SUMMARY OF THE INVENTION

It is therefore a principal object of the invention to provide a filter cartridge that permits assurance that the filter cartridge is properly configured for use with the head or base of the filter assembly to which it is being connected.

In accordance with a first aspect of the invention, this object is achieved by providing an assembly comprising a filter cartridge which is adapted for removable connection to a base of a liquid filter assembly, and a signal transmitter which is mounted on the filter cartridge and which is configured to transmit a signal indicative of the presence of the filter cartridge in the filter assembly. The transmitter preferably comprises a magnet which is configured to generate and transmit a magnetic field which is detectable by a magnetic field detector on the base.

Another object of the invention is to provide a filter assembly adapted for the conveyance of information between the filter cartridge of the filter assembly and the head of the filter assembly.

In accordance with a second aspect of the invention, this object is achieved by providing a base, a detector which is mounted on the base, a filter cartridge which is adapted for removable connection to the base, and a signal transmitter which is mounted on the filter cartridge and which transmits a signal that is detectable by the detector.

Preferably, the transmitter and the detector are configured such that the detector is capable of detecting whether or not the filter cartridge is properly configured for use with the base. For instance, the transmitter and the detector may be capable of detecting whether or not the filter cartridge has at least one of 1) a filtration capacity of above a designated volume and 2) a designated filtration medium.

Another object of the invention is to provide a filtration system that is capable of monitoring liquid flow therethrough and that also is capable of at least one-way communication with a filter cartridge of the system.

In accordance with another aspect of the invention, this object is achieved by providing a filter assembly, a flow meter, and a computer. The filter assembly includes a base, a detector which is mounted on the base, and a filter cartridge which is configured for removable connection to the base and which is adapted to receive raw liquid from the base, to treat the liquid, and to return treated liquid to the base. The filter assembly additionally includes a signal transmitter which is mounted on the filter cartridge and which transmits a signal that is detectable by the detector. The flow meter monitors the flow of liquid through the filter assembly. The computer receives signals from the detector and from the flow meter and selectively generates and transmits signals indicative of 1) the presence of the filter cartridge in the filter assembly, and 2) liquid flow through the turbine cartridge.

Preferably, the transmitter comprises a magnet and the detector comprises a magnetic field detector such as a reed switch or a low-power Hall effect sensor.

The flow meter preferably includes a generally cylindrical turbine cartridge, a turbine which is made substantially entirely out of a magnetic material, and a magnetic field detector which monitors movement of the turbine and which is coupled to the computer.

Preferably, the transmitter and the detector are configured such that the detector is capable of detecting whether or not the filter cartridge is properly configured for use with the base. For instance, the transmitter and the detector may be capable of detecting whether or not the filter cartridge has at least one of 1) a filtration capacity of above a designated volume and 2) a designated filtration media.

Another object of the invention is to provide a method of assuring proper operation of a filtration system by altering the operation of the system if a properly-configured filter cartridge is not installed in the system.

In accordance with still another aspect of the invention, this object is achieved by attaching a filter cartridge to a base of a filtration system, transmitting a signal from the filter cartridge to the base, receiving the signal at the base, and automatically enabling a function of the filtration system only upon receipt of the signal by the base.

The transmitting step preferably comprises generating and transmitting a magnetic signal, and the detecting step preferably comprises closing a reed switch.

The method additionally preferably comprises 1) monitoring liquid flow through the filtration system and displaying humanly-discernable information indicative of the liquid flow, and 2) altering the display in the absence of the receipt of the signal at the base. The altering step may comprise overriding a flow characteristic display command and displaying a signal requesting filter cartridge installation. Additionally, the method may further comprise automatically detecting filter cartridge replacement by detecting the absence of a filter cartridge in the filtration system followed by the detection of the presence of a replacement filter cartridge in the filtration system, and automatically resetting at least one counter upon detecting filter cartridge replacement.

Yet another object of the invention is to automatically determine whether or not a filter cartridge is properly configured for use in a filtration system.

In accordance with still another aspect of the invention, this object is achieved by 1) connecting a filter cartridge to a base of a filtration system so as to permit raw liquid to flow into the filter cartridge from the base and so as to permit treated liquid to flow into the base from the filter cartridge, and 2) establishing a communication between the filter cartridge and the remainder of the filtration system that enables a determination of whether or not the filter cartridge is properly-configured for use with the base.

The step of establishing a communication preferably comprises transmitting a signal from the filter cartridge to the base and receiving the signal at the base.

In addition, the filter can communicate its capacity and/or removal capability.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 6 is a sectional side elevation view of the sensor assembly of FIG. 5;

FIG. 7 is a sectional end elevation view of the sensor assembly of FIGS. 5 and 6;

FIGS. 22–25 are flow charts of the display and calculation logic used by the microcontroller of the liquid flow meter of FIGS. 1–4;

FIG. 26 is a partially cut-away side elevation view of a filtration system incorporating a liquid flow meter constructed in accordance with a second preferred embodiment of the invention;

FIG. 27 is an end elevation view of an alternative turbine usable in the liquid flow meter of the present invention;

FIG. 28 is a sectional side elevation view taken along the lines 28—28 in FIG. 27;

DETAILED DESCRIPTION OF THE PREFERRED EMBODIMENTS

1. Resume

Figure 1:
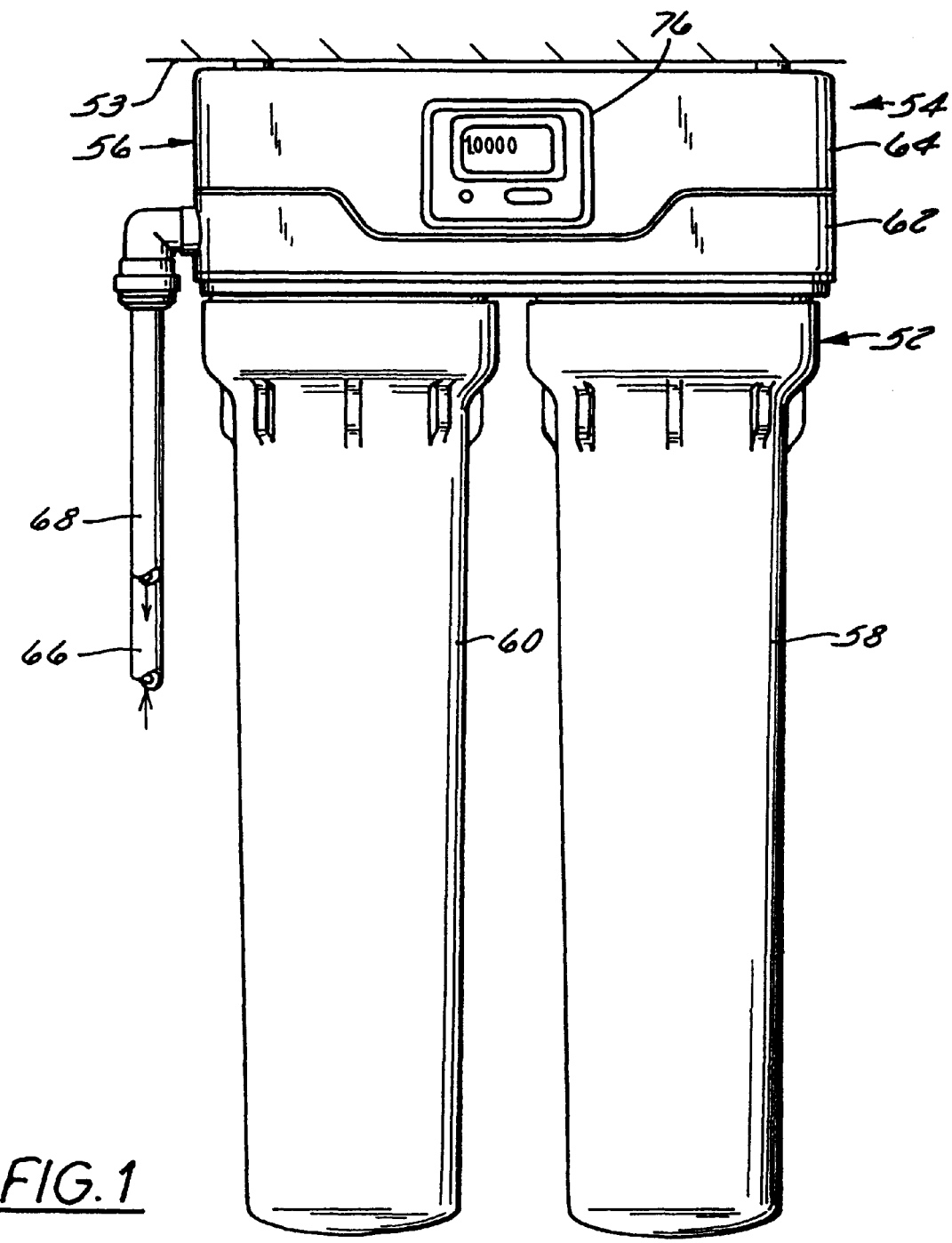
FIG. 1 is a filtration system incorporating a liquid flow meter constructed in accordance with a first preferred embodiment of the present invention.

A filter cartridge is provided that is capable of at least one-way communication with the base of a filtration system so as to confirm that the filter cartridge is properly configured for installation and use in the filtration system. Transmission and receipt of a filter presence confirmation signal can enhance the effectiveness of the filtration system, e.g., by disabling one or more operational characteristics of the system in the absence of a confirmation signal, and/or by automatically resetting one or more counters of a capacity indicator of the system upon receipt of the confirmation signal. The filter cartridge is particularly well-adapted for use in a filtration system having a flow meter which monitors the flow of liquid through the system. In this case, the filter cartridge is operative to transmit signals to a detector on the associated base, and the operation of the flow meter and of the associated capacity indicator vary depending upon whether or not a filter presence confirmation signal is acquired by the detector.

2. System Overview

A filter cartridge which is capable of transmitting filter cartridge presence confirmation signals to the remainder of the filtration system is useful in a variety of liquid filtration systems. It is particularly well-suited for use with a potable water filtration system having a flow meter which monitors the flow of water through the system's filter assembly and which acquires and displays information relating to used and/or remaining filtration capacity. The invention therefore will be described primarily in conjunction with respect to a particular potable water filtration system employing a novel liquid flow meter. It should be understood, however, that the invention is useful with a wide variety of other liquid filtration systems as well.

Referring to the drawings and initially to FIGS. 1–4 in particular, a liquid flow meter 50 usable with a first preferred embodiment of the invention is shown in conjunction with a standard under-the-counter type filter assembly 52 to form a filtration system 54 with an internal flow meter. However, it should be understood that the liquid flow meter 50 could be used in virtually any application in which liquids flow through an enclosed stream such as a tube, conduit, or internal passageway and in which an accurate indication of liquid flow through the enclosed stream is desired.

The illustrated filter assembly 52 is, except for receiving the liquid flow meter 50, conventional. The filter assembly 52 includes a base 56 configured for mounting on a wall (not shown) beneath a countertop 53 and at least one filter cartridge mounted on and extending downwardly from the base. However, the filter assembly 52 could also be mounted on a countertop or even mounted to extend horizontally. The flow meter 50 would operate equally as well because its flow sensor 74 (detailed below) is not orientation sensitive. The illustrated embodiment has two filter cartridges 58, 60 hereafter referred to as "the first stage filter cartridge" 58 and "the second stage filter cartridge" 60, respectively. The base 56 is formed from a lower section 62 and an upper section 64. The upper section 64 of the base 56 mounts on the lower section 62 to form a chamber therebetween. The lower section 62 has internal flow conduits and fittings formed therein for conveying liquids between a supply tube 66 connected to a source of raw water, the first stage filter cartridge 58, the second stage filter cartridge 60, and a treated water discharge tube 68. A supply tube 72, positioned in the chamber between the lower section 62 and the upper section 64, connects the outlet of the first stage filter cartridge 58 to the inlet of the second stage filter cartridge 60. Mounting the sensor assembly 74 downstream of at least one filter cartridge of the monitored filtration system is desirable because the first stage filter removes large particulates that might otherwise interfere with operation of the sensor assembly.

Figure 4:
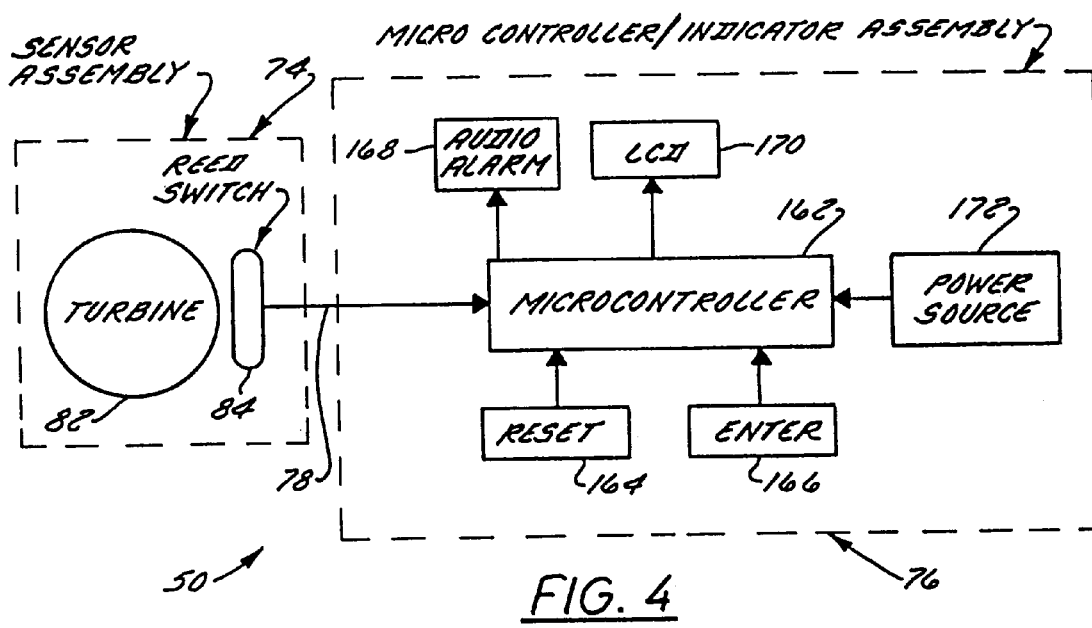
FIG. 4 schematically illustrates the major components of the liquid flow meter of FIGS. 1–3.

Referring especially to FIG. 4, the liquid flow meter 50 includes a sensor assembly 74 and a microcontroller/indicator assembly 76 connected to one another by an electrical cable 78. The sensor assembly 74 is inserted in the supply tube 72, and the microcontroller/indicator assembly 76 is mounted in an aperture in the upper section 64 of the base 56 as seen in FIG. 1 so as to be visible and accessible by a user.

In use, water to be treated enters the filter assembly 52 of the filtration system 54 through the supply tube 66, is treated in the first stage filter cartridge 58, flows through the supply tube 72 and sensor assembly 74, is treated further in the second stage filter cartridge 60, and then is discharged from the filter assembly 52 through the discharge tube 68. The liquid flow meter 50 monitors at least the volume and possibly also the flow rate of the liquid flowing from the first stage filter cartridge 58 to the second stage filter cartridge 60 and provides an indication of the monitored parameter(s).

The preferred structure and operation of the liquid flow meter 50 will now be detailed.

3. Construction of Liquid Flow Meter

Figure 5:
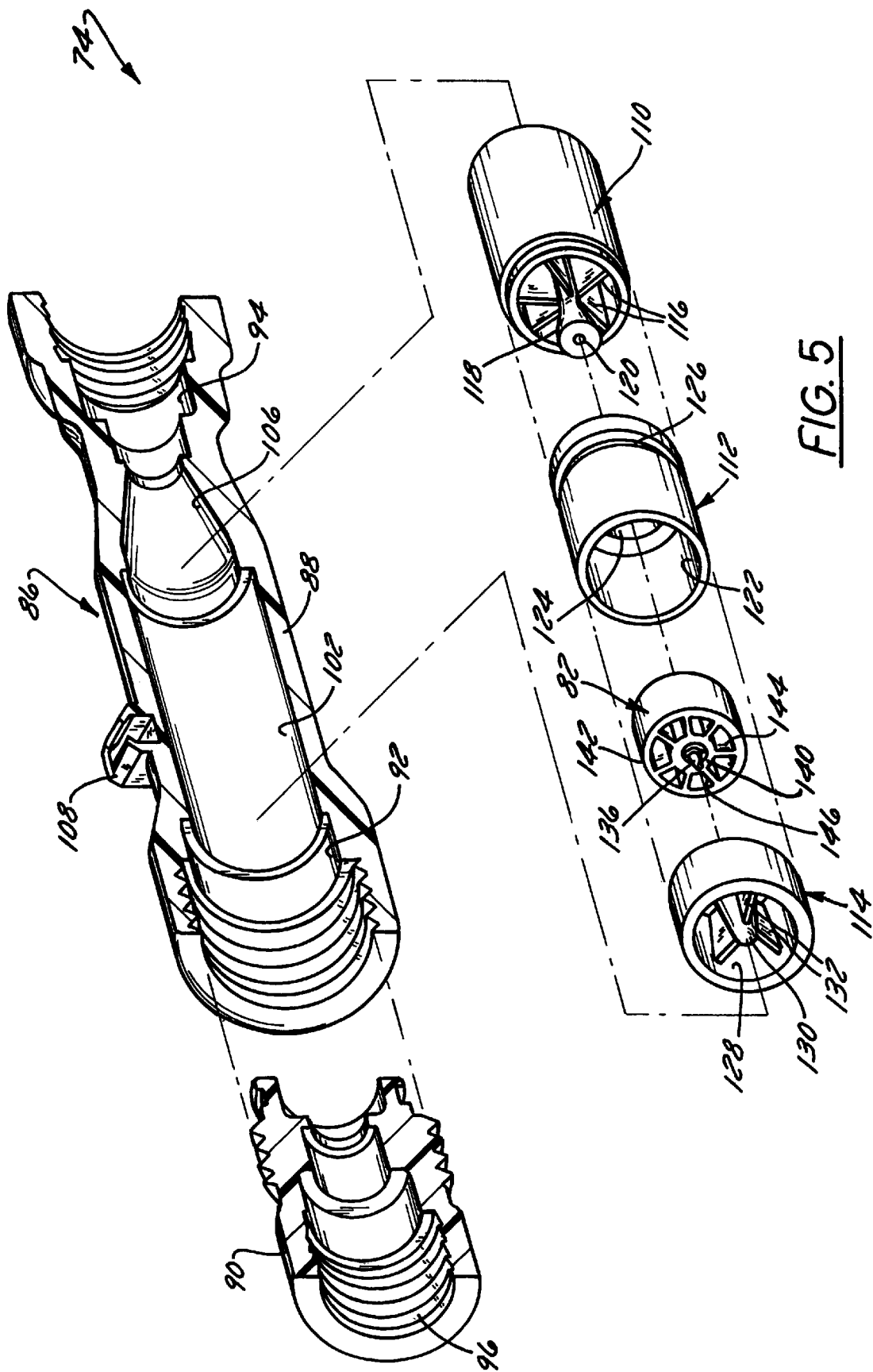
FIG. 5 is a partially cut-away perspective view of the sensor assembly of the liquid flow meter.

As discussed briefly above, the liquid flow meter 50 includes the sensor assembly 74 and the microcontroller/indicator assembly 76. The sensor assembly 74 includes a turbine cartridge 80, a turbine 82, and a detector 84 that detects movement of the turbine 82 (FIGS. 4–6). In the illustrated embodiment in which the sensor assembly 74 is disposed at a location in which the filter assembly 52 lacks adequate rigidity to support the turbine cartridge 80, the sensor assembly 74 additionally includes a housing 86 that supports the turbine cartridge 80. Each of these components will now be detailed.

Figure 2:
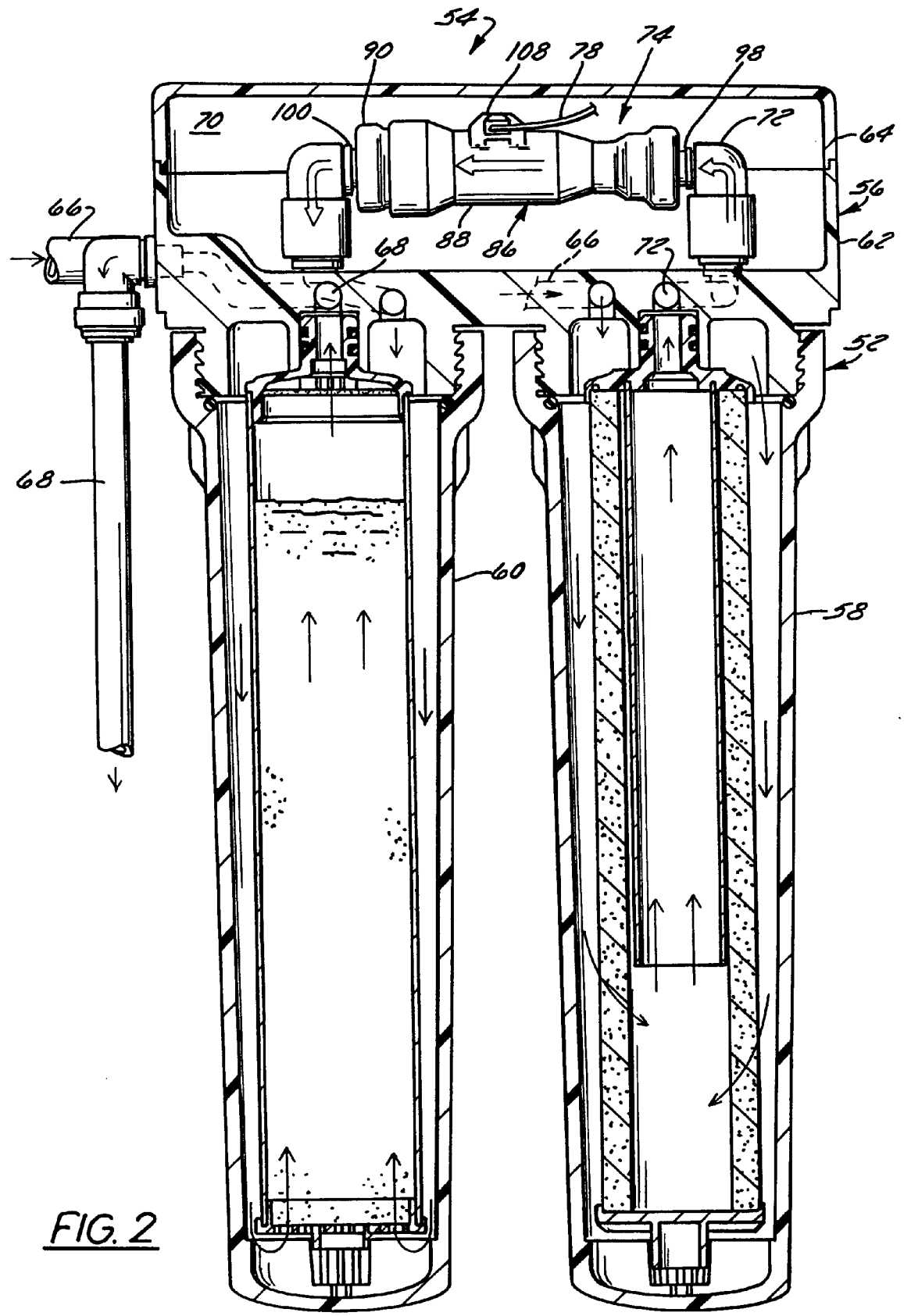
FIG. 2 is a sectional side elevation view of the filtration system of FIG. 1.

Referring now to FIGS. 5–7, the cartridge housing 86 is designed to house and support the turbine cartridge 80 in those applications in which the filter assembly 52 or other structure with which the flow meter 50 is being used lacks a structure capable of performing these functions. The housing 86 includes 1) a body 88 having an upstream end and a downstream end (the downstream end being seen to the left of the arrow in FIG. 2) and 2) a cap 90 threaded onto the downstream end of the body 88. A bore 92 is formed axially through the body 88 and the cap 90. Inlet and outlet ports 94 and 96 are formed by the upstream end and downstream end of the bore 92, respectively. These ports 94 and 96 receive suitable fittings 98 and 100 for connection to sections of the supply tube 72 as best seen in FIGS. 2 and 6. A cartridge chamber 102, formed from an enlarged, constant diameter section of the bore 92 begins at the downstream end of the body 88 and extends a substantial distance towards the upstream end. Another portion 106 of the bore 92, located between the upstream end of the body 88 and the cartridge chamber 102, increases continuously in diameter from the upstream end of the portion 106 to the downstream end of the portion 106 to provide a smooth transition from the inlet port 94 to the cartridge chamber 102. A detector housing 108 is formed on an outer wall of the body 88 adjacent the cartridge chamber 102 for receiving the detector 84 in a snap-fit manner as detailed below.

Figure 8:
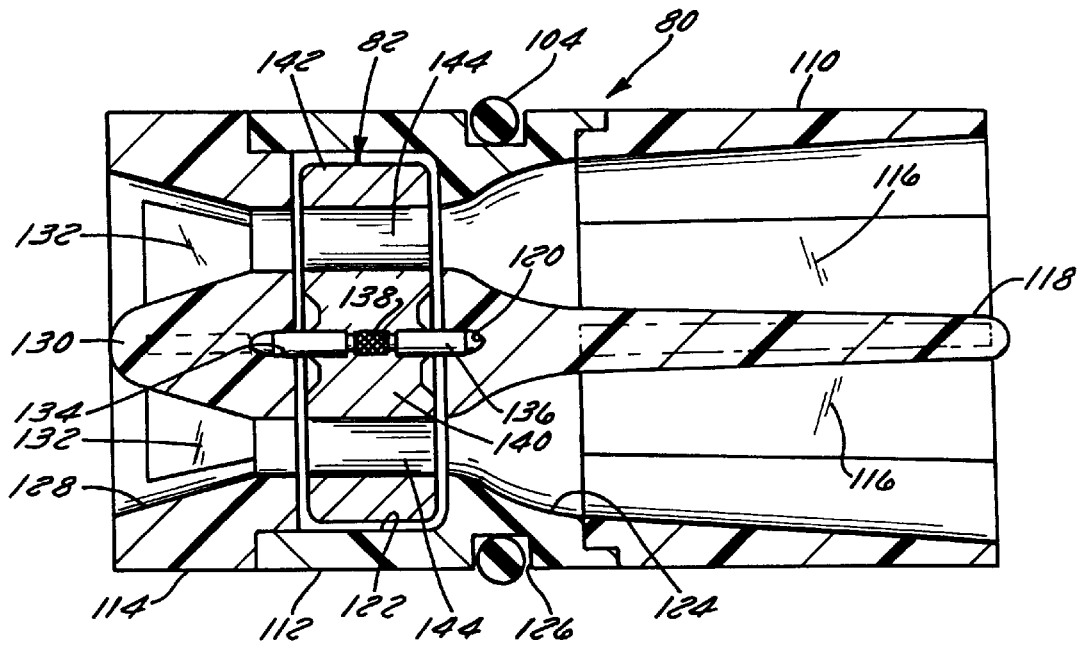
FIG. 8 is a sectional side elevation view of the turbine cartridge and turbine of the sensor assembly of FIGS. 5–7.
Figure 10:
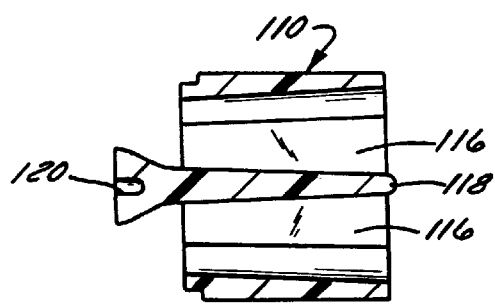
FIG. 10 is a sectional side elevation view taken along the lines 10—10 in FIG. 9.
Figure 9:
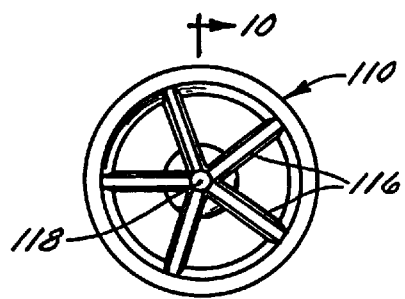
FIG. 9 is an end view of the flow divider of the turbine cartridge of FIGS. 5–8.
Figure 12:
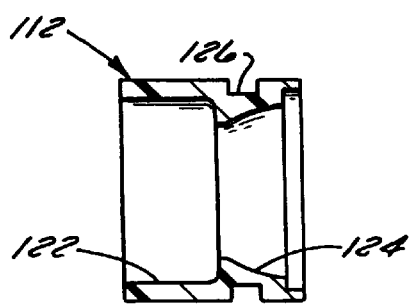
FIG. 12 is a sectional side elevation view taken along the lines 12—12 in FIG. 11.
Figure 11:
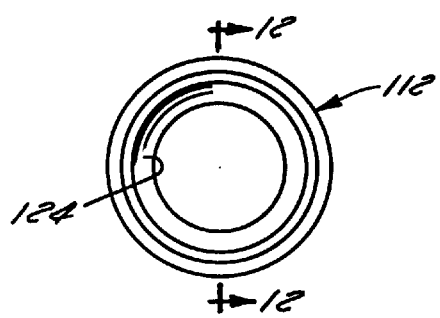
FIG. 11 is an end view of the turbine housing for the turbine cartridge of FIGS. 5–8.
Figure 13:
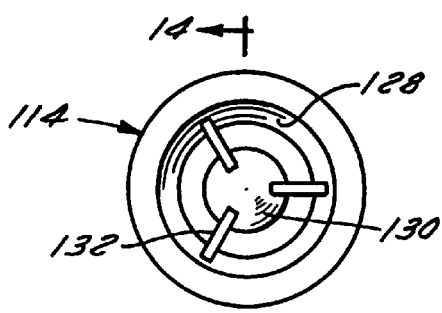
FIG. 13 is an end view of the exit cone of the turbine cartridge of FIGS. 5–8.
Figure 14:
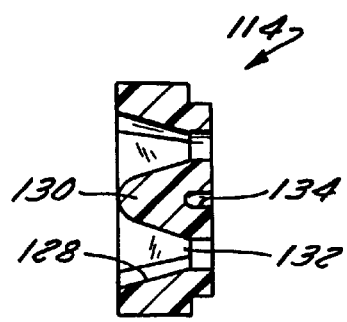
FIG. 14 is a sectional side elevation view taken along the lines 14—14 in FIG. 13.

The turbine cartridge 80, which is sealed in the cartridge chamber 102 of the housing 86 by an O-ring 104, serves several functions. First, it rotatably supports the turbine 82. Second, it is designed to promote laminar liquid flow into and out of the turbine 82 with minimal pressure drop. Third, it is shaped and configured to be usable in a wide variety of locations, thereby facilitating the incorporation of the liquid flow meter 50 into existing filter assembly designs with minimal modification. Fourth, it is designed to hold very close tolerances despite the fact that it is made out of plastic. Towards these ends, the turbine cartridge 80 is formed from a multi-component plastic structure in which each of the components is relatively small and has relatively thin walls to facilitate molding and to hold close tolerances. All of these components preferably are formed from a molded copolymer acetal known as Celcon. Celcon is preferred because it is dimensionally stable both in molding and in use in water and other liquids. It also has good wear characteristics and exhibits a low coefficient of friction. The illustrated and preferred turbine cartridge 80 has three components: an upstream flow straightener 110, a central turbine housing 112, and a downstream exit cone 114 (FIGS. 5, 6, and 8). In order to facilitate molding while holding very tight tolerances, the outer peripheral wall of each of the components 110, 112, and 114 is very thin, usually having an average thickness of less about than 0.15", and preferably less than about 0.063" on average.

The flow straightener 110, best seen in FIGS. 5, 6, 9, and 10, has a plurality of rib-like structures 116 formed therein which extend radially from the inner surface of the outer peripheral wall of the flow straightener 110 to a central post 118. These rib-like structures 116 promote laminar liquid flow into the turbine 82 by straightening liquid flowing into the flow straightener 110 from the inlet of the cartridge housing 86. The central post 118 is collinear with an axial centerline of the bore 92. The downstream axial end of this post 118 has an aperture 120 formed therein to form a bearing for supporting the turbine 82 as discussed below.

Referring to FIGS. 5, 6, 11, and 12, turbine housing 112 is clamped between the flow straightener 110 and the exit cone 114. Turbine housing 112 presents an axial bore including a downstream turbine chamber 122 and an upstream portion 124. The turbine 82 is housed in the turbine chamber 122 with slight axial and radial clearances. The upstream portion 124 curves outwardly from the turbine chamber 122 to the upstream end of the turbine housing 112 to promote laminar flow into the turbine 82. A groove 126 is formed in the outer peripheral surface of the turbine housing 112 for receiving the O-ring 104.

The exit cone 114, best seen in FIGS. 5, 6, 13, and 14, also has outwardly flared walls 128 extending along at least a substantial length thereof to further reduce back pressure. A second post 130, supported in the exit cone by radial supports 132, extends in parallel with the axial centerline of the turbine cartridge 82. Post 130 has an aperture 134 formed in its upstream end for supporting the turbine 82 as detailed below.

Figure 16:
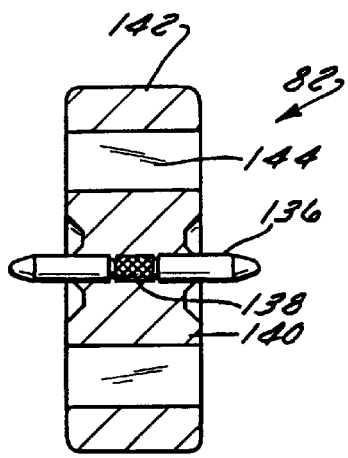
FIG. 16 is a sectional side elevation view taken along the lines 16—16 in FIG. 15.
Figure 15:
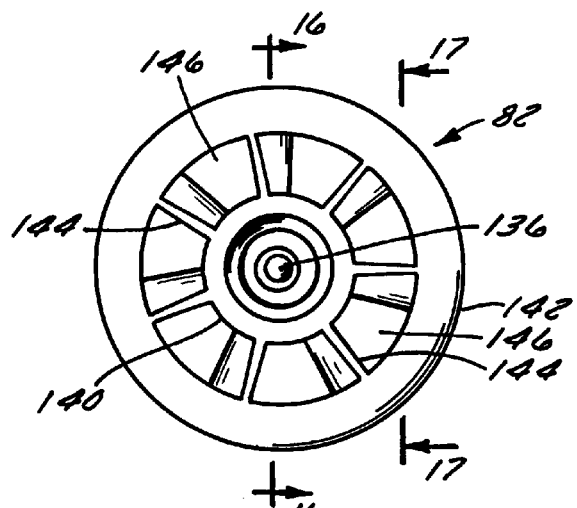
FIG. 15 is an end view of the turbine of the sensor assembly of FIGS. 5–7.
Figure 17:
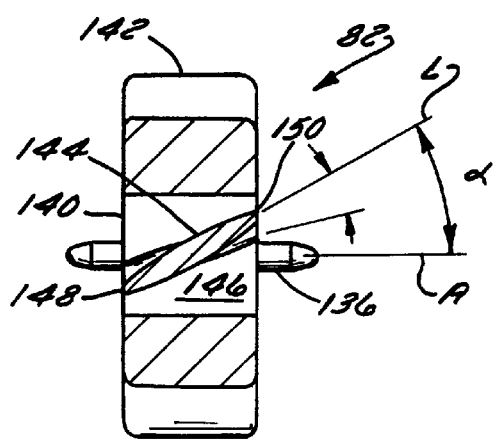
FIG. 17 is a sectional side elevation view taken along the lines 17—17 in FIG. 15.
Figure 18:
FIG. 18 is a side elevation view of the shaft for the turbine of FIGS. 15–17.

The turbine 82 is mounted in the turbine cartridge 80 by a shaft 136 that has opposed ends rotatably supported in the bearings formed by the apertures 120 and 134 in the flow straightener 110 and the exit cone 114, respectively. The bearing shaft not only reduces torque requirements for the turbine 82, but also prevents the turbine 82 from rubbing against the flow straightener 110 or exit cone 114 and hence prevents magnetic materials from rubbing off from the turbine 82 and washing into the treated water stream. As best seen in FIGS. 16–18, the ends of shaft 136 are tapered to minimize the contact area between the axial ends of the shaft 136 and the bearings, hence minimizing friction between the shaft 136 and the bearings 120 and 134. The bearings 120 and 134 are lubricated and cooled by the flow of the monitored liquid through the turbine 82. This sort of integrated bearing construction is made possible in part by the close tolerances imposed on cartridge construction. As discussed above, these close tolerances are in turn made possible because all components of the turbine cartridge 80 are relatively small, thin walled, low friction plastic components.

The turbine 82 forms the heart of the flow meter 50. It is designed to require minimal torque to turn, to impart a very small pressure drop on liquids flowing therethrough, and to have a high degree of linearity over a relatively broad range of liquid flow rates therethrough. Meeting these criteria represented a significant design challenge with the greatest areas of difficulty being in blade design and magnet configuration. The manner in which these criteria were met will be described after briefly describing the structure of the turbine 82.

Referring particularly to FIGS. 5, 6, and 15–18, the turbine 82 is a one piece molded magnetic element that includes a central circular hub 140, an outer annular ring 142, and a plurality (7 in the illustrated embodiment) of vanes or blades 144 extending outwardly from the hub 140 to the ring 142. The turbine 82 is approximately 0.19" long. The ring 142 has an outer diameter of 0.525" and a thickness of about 0.065". The hub has a diameter of about 0.220" so that an annular space 146, segmented by the blades 144, is formed between the hub 140 and the ring 142 the space 146 is about 0.09" thick. As can best be seen in FIG. 17, the blades 144 extend through the space 146 at an acute angle a with respect to the rotational axis A of the turbine 82. The geometry of the turbine 82 is symmetrical about a radial plane bisecting the turbine. This permits the turbine 82 to operate the same way no matter how it is inserted into the cartridge.

Optimizing the blade design proved instrumental to turbine design. The dimensions of the blades 144 relative to the dimensions of the hub 140 and the ring 142 and the number of blades 144 were selected to permit molding the turbine and to strike an acceptable compromise between low flow rate performance and high flow rate performance. Higher liquid velocities are preferred to permit low-pressure liquid streams to impart sufficient torque on the turbine 82 to turn it, but pressure drops increase with increases in velocity. High pressure drops at low operating pressures degrade filter assembly performance. The blade configuration therefore is designed to maintain flow linearity while minimizing pressure drop. That is, in many turbines, as flow rates through the turbine vary, so do the number of revolutions of the turbine per gallon of liquid flowing through it. The turbine 82 should preferably have a linear relationship with flow rates such that the rotational velocity of the turbine 82 varies linearly with flow rates through the turbine 82 so that, at any given volumetric flow rate within the flow meter's rated operational range of flow rates, the number of turbine revolutions per unit volume remains the same (note the curve 262 in FIG. 20, discussed in greater detail below). It has been found that blade length, width, and angle can be combined with hub width and ring width and optimized for maintaining linearity and minimizing pressure drop over the rated operating flow rate range.

The turbine 82 of the illustrated embodiment is designed for use in a residential water filtration system or other application having a desired operational flow rate range of from about 0.4 gallons per minute to 4.0 gallons per minute or more. The turbine 82 therefore is designed to maintain linearity over that range with minimal pressure drop. Towards these ends, the angle $\alpha$ at which the blades 144 extend from the axis A of the turbine 82 is set at an initial angle of 30° at the inside surface of the ring 142. This angle decreases progressively to a theoretical angle of 0° at the center of the hub 140 to compensate for the fact that tangential velocities decrease as one approaches the center of a rotating object. Changes of more than 5° from that selected initial 30° angle were found to create marked reductions in linearity.

As best seen in FIG. 17, the opposed side edges 148 and 150 of each of the blades 144 taper inwardly towards a lateral centerline L of the blade 144 such that each blade 144, when viewed in transverse cross-section, is generally elliptical in shape with a maximum thickness of about 0.031". It has been found that this tapered blade profile minimizes disruption of the inflowing liquid stream and helps promote laminar flow through the turbine 82. In addition, the elliptical profile is believed to act similarly to an air foil to help pull the turbine 82 around the turbine chamber 122 at low flow rates.

The pressure drop across the turbine is further minimized by the fact that only a relatively small percentage of the turbine's axial surface area is subjected to contact with flowing liquid. As should be apparent from FIGS. 7 through 11, the flow straightener 110, turbine 82, and exit cone 114 cooperate with one another such that only the blades 144 of the turbine 82 are exposed to liquid flow. The hub 140 and outer annular ring 142 mesh smoothly with corresponding components of the flow straightener 110 and the exit cone 114 so that the axial faces of these elements are not subject to contact with flowing liquid. As a result, sensitivity is enhanced and bearing area is reduced.

Choosing a material for the turbine 82 also proved important to the design. Prior known turbine configurations, such as that disclosed in the above-described Silverman patent, employed one or more discrete bar magnets as the turbine position indicator. More specifically, a bar magnet typically would be imbedded axially into the hub of the turbine on one side of the turbine's rotational axis, and either another magnet or a counterbalancing weight would be imbedded on the other side of the axis. This discrete magnet-type assembly exhibits several disadvantages.

For instance, the flux generated by the magnet interacts with the reed switch or other magnetic pick-up device to imposes a torque on the turbine that resists turbine rotation away from the pick-up device. Ideally, the flux generated by the magnet and the resulting torque should ramp or drop off gradually as the pole of the magnet moves away from the detector so as to reduce as much as possible this resistive torque. However, in a discrete magnet, flux drops off relatively quickly, resulting in relatively high resistance to turbine movement and inhibiting the ability of the flow meter to operate at low flow rates.

In addition, the flux lines from the magnet flow from the north end of the magnet radially around along the sides and into the opposite south end. At any given distance from the center of the surface of the magnet, there is a null area where the magnetic field is zero. This may result in two activations of the detector during each cycle of revolution of the turbine and hence in the recording of two pulses per turbine revolution. If one wishes to prevent multiple pulses from being counted when a conventional bar magnet is used as a position indicator, the magnet must be positioned off-center from the detector. In either event, use of a conventional bar magnet results in less than optimal operation of the detector.

It has been recognized previously that the problems associated with discrete magnets might be alleviated if a turbine having an integrated magnet could be developed. However, a suitable magnetic turbine heretofore was unavailable.

The problems associated with prior discrete magnet turbines have been overcome through the development of a turbine 82 that is formed from a magnetic material that is magnetized in such a way that the north and south poles are located on the periphery of the ring 142 adjacent one another so that, when the juncture between the north and south poles is located adjacent the detector 84, flux lines flow directly outwardly from the north pole, through the detector 84, and back to the adjacent south pole with the flux dropping off gradually as the juncture between the poles moves away from the detector 84. Accordingly, only one pulse is recorded per turbine revolution, and resistive torques imposed on the turbine due to interaction between the detector 84 and the magnet are reduced.

In order to form a magnetic turbine meeting these requirements, the turbine 82 is formed from a molded plastic/magnetic powder composition and then sealed to prevent the magnetic powder from washing out of the turbine 82 during monitoring operations. The composite material includes a magnetic powder admixed with a polymer carrier. Trace amounts of a flow promoter, a processing agent, or another additive may also be added to the mixture as desired. Although several magnetic powders and polymer carriers are available, the preferred powder and carrier are neodymium iron boron and a high-flow nylon, respectively because this composition can be used to mold thin blades while still being capable of being magnetized as required. The preferred composition includes 25–60% by volume, preferably about 35% by volume, of neodymium iron boron, with nearly all of the remainder (except for the possible inclusion of trace amounts of additives referenced above) comprising high-flow nylon. Particle sizes of the magnetic powder may vary in size from 3 microns up to 420 microns with a preferred value of about 200 microns.

The turbine 82 is fabricated in a multi-step process. First, the magnetic powder and polymer carrier are mixed. The mixture is molded into the desired turbine shape via injection molding, casting, compression molding, or the like. The support shaft 136 is also molded in place during molding. (The shaft 136 preferably has a knurled central portion 138 to facilitate its retention in the turbine hub 140.)

After molding, a thin coating of a sealant may be applied to the turbine 82 to prevent the magnetic powder from leaching or washing into the monitored liquids. However, only very small quantities of powder leach or wash out of the turbine because most of the powder particles are fully encapsulated in the polymer carrier. Only those particles which are exposed to the turbine's surface are subject to leaching. Coating therefore is required only in those applications in which extreme purity of treated liquid is required. In those instances in which sealant application is desirable, a sealant known as Parylene-C, manufactured by Specialty Coating Systems of Indianapolis, Ind., is applied by vapor deposition. The deposited layer of the Parylene-C is extremely thin, on the order of 0.0003".

Then, the turbine 82 is magnetized via a conventional process so that its north and south poles extend generally peripherally and are located generally adjacent one another as described above.

The detector reed 84 comprises the final component of the sensor assembly 74. The detector could comprise a Hall-effect sensor or the like but preferably comprises a reed switch. The preferred reed switch includes a reed 152 that is mounted in a reed housing 154 and that is electrically connected to the cable 78 by wires 156. The reed is axially off-set from the center of the housing 154 as best seen in FIG. 7 so as to be located at a distance from the turbine 82 that optimizes magnetic interaction between the turbine 82 and the reed 152. The reed housing 154 is snap-fit into the detector housing 108 formed in the cartridge housing 86. The reed switch 84 should be configured to minimize the attraction of the magnet to the reed and hence to minimize the torque placed on the turbine 82 by the reed. The preferred reed switch 84 is manufactured by Hamlin Company and marketed under Model No. MDSR-7 6-15 AT.

4. Construction Of Microcontroller/Indicator Assembly

Figure 19:
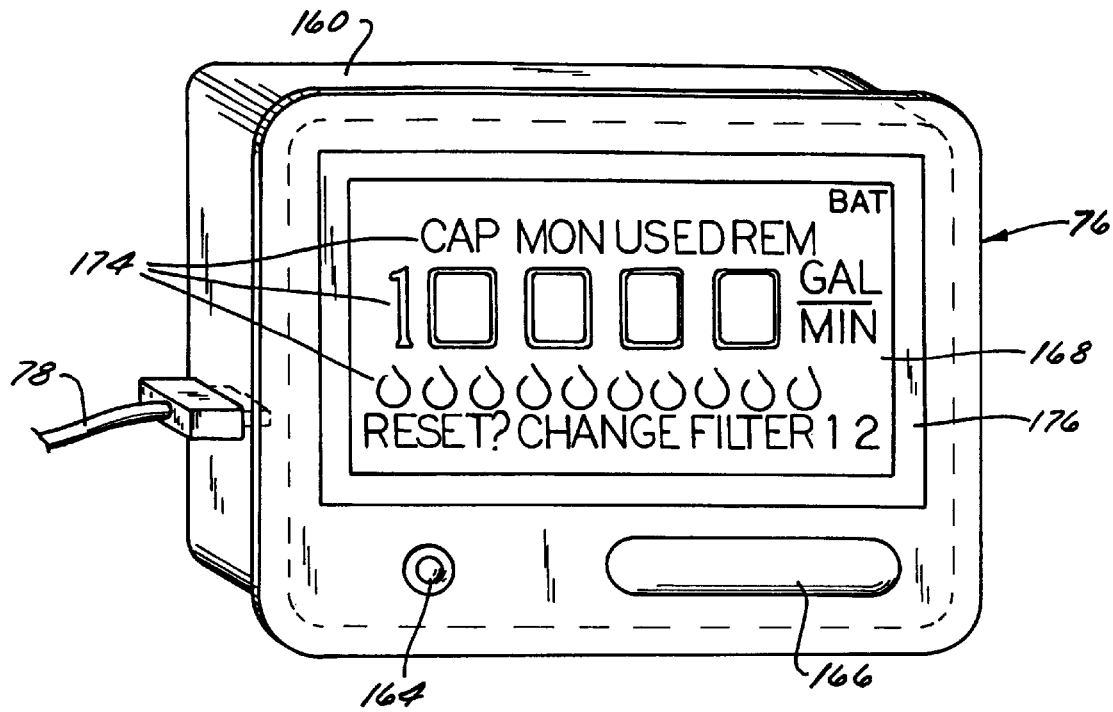
FIG. 19 is a perspective view of a microcontroller/indicator assembly of the liquid flow meter of FIGS. 1–4.

The microcontroller/indicator assembly 76 includes circuitry, controls, and displays for performing calculations based upon signals received from the sensor assembly 74 and for displaying relevant information concerning liquid flow. Referring to FIGS. 4 and 19, the assembly 76 is encased in a housing or casing 160 that may be mounted at a location remote from the sensor assembly 74. In the illustrated embodiment, the housing 160 is mounted in the upper section 64 of the base 56 of the filter assembly 52 as described above. The microcontroller/indicator assembly 76 includes a computer or microcontroller 162, a RESET button 164, a DISPLAY button 166, an audio alarm 168, and a visual indicator 170 all supplied with power by a power source 172 which also supplies power to the reed switch 84. It may also contain one or more drivers for external displays—an important feature in some applications in which the filtration system is located in a relatively non-accessible location. Due to the low power requirements of the flow meter 50, the power source may comprise a battery of about 3.0 volts or even less. The cable 78 completes the assembly 76 and, as discussed above, is connected to the reed switch 84 as seen in FIGS. 2 and 7 and plugged into the casing 160 as best seen in FIG. 19 to transmit signals between the reed switch 84 and the remainder of the assembly 76.

The computer or microcontroller 162 may include a conventional microprocessor which operates with one or more counters and one or more timers of the microcontroller or may comprise any other device capable of determining volumetric flows by counting pulses from the detector 84. Microcontroller 162 also includes drivers for selectively illuminating the visual indicator 170 to illuminate one or more of the elements 174 seen on face 176 of the housing 160 in FIG. 19. This visual indicator 170 preferably comprises one or more LCDs but could comprise one or more LEDs or the like.

Referring now to FIGS. 22–25, the microcontroller 162 is programmed to count pulses delivered by the reed switch 84 and to calculate and to at least selectively display 1) information concerning the aggregate volume of liquid that has flowed through the flow meter 50 since counting began, 2) the flow rate of liquid through the flow meter 50, and 3) information concerning the elapsed time since timing began. The routines for performing these functions will now be detailed with reference to FIGS. 22–25.

All of the following discussions relate to a flow meter designed for use with potable water filtration systems designed for household use. However, the flow meter 50 could be adapted to operate in markedly different installations with no changes to the sensor assembly 74 and with only minor changes to the display and calculation capabilities of the microcontroller/indicator assembly 76.

Figure 23:
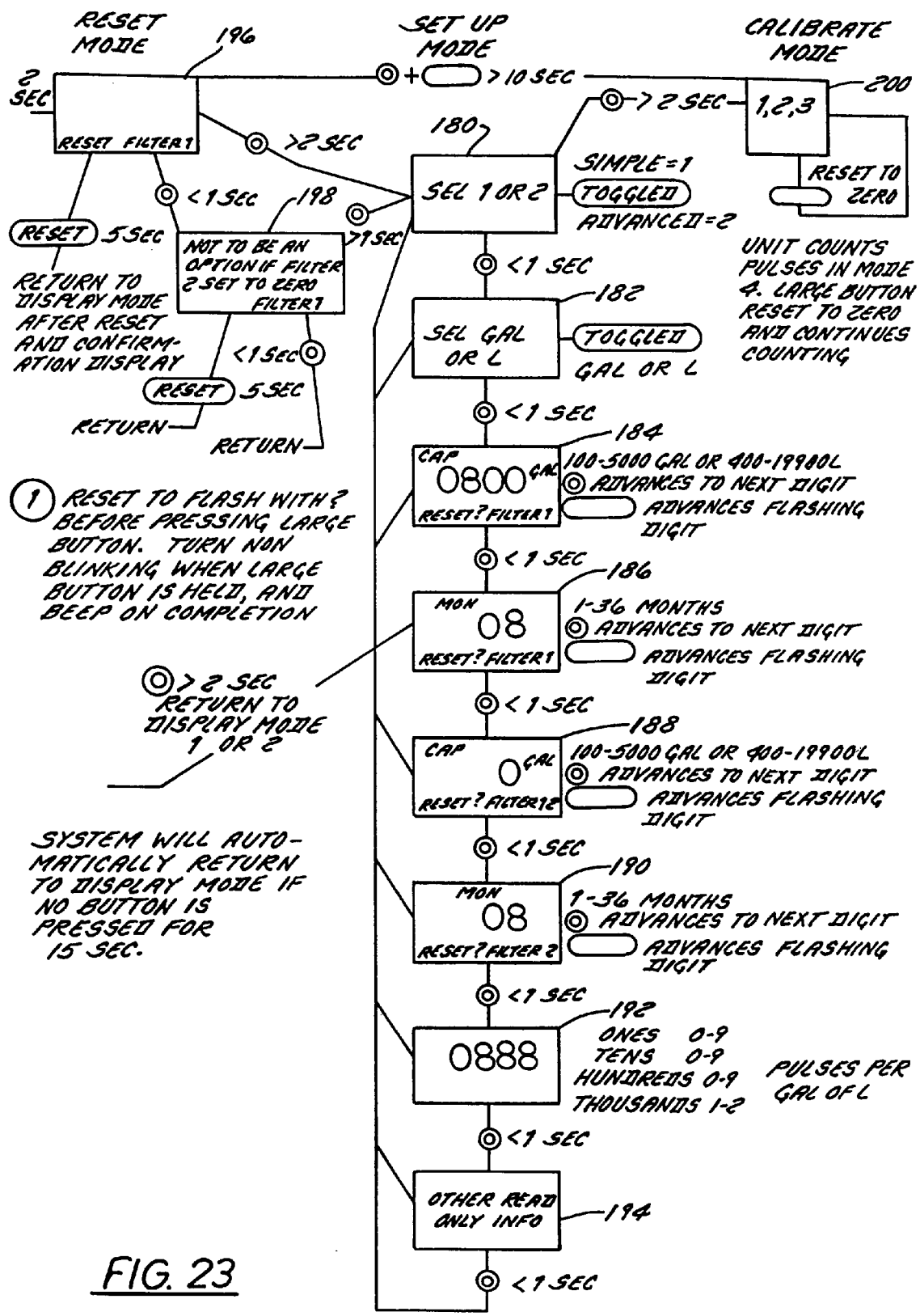

The flow meter 50 is first set-up for use with a desired filtration system by placing the microcontroller/indicator assembly 76 in a SET-UP mode using the procedure illustrated in FIG. 23. The SET-UP mode capability permits the liquid flow meter 50 to be programmed for use in filtration systems having either one or two filter cartridges and permits the liquid flow meter 50 to be used with filtration systems incorporating filter cartridges having different rated lives (both in time and in volumetric capacity) and even in two-filter cartridge filtration systems in which each of the two filter cartridges has a different rated life. Programming requires only the toggling of the RESET and DISPLAY buttons 164 and 166 in designated sequences. (The RESET button 164 is illustrated by concentric circles in the drawings, and the DISPLAY button 166 is illustrated by an ovoid structure).

Specifically, referring to FIG. 23, the buttons 164 and 166 can be used to set the flow meter 50 to monitor either one or two filter cartridges, to set the assembly 76 to display in either a BASIC display mode or an ADVANCED display mode (block 180); to set the LCD to display volumes in either gallons or liters (block 182); to set a rated volumetric capacity of from 100 gallons to 5,000 gallons for each filter cartridge to be monitored (blocks 184 and 188); and to set a rated life of from 1–36 months for each filter cartridge to be monitored (blocks 186 and 190). "Zero" values are input in blocks 188 and 190 for one-filter cartridge systems to disable display of information about a second filter cartridge. Finally, the pulses (or detected turbine revolutions) per gallon or liter and any other necessary read-only information required to calculate volumes and flow rates are also input in blocks 192 and 194, respectively. In order to assist manufacturer evaluation of used assemblies, this read-only information may include 1) total gallons that have flowed through the sensor, regardless of RESET operations, 2) total time that the sensor has been in operation, regardless of RESET operations, and 3) the number of RESET operations. The specifics of this SET-UP operation are believed to be self-evident from FIG. 23 and, accordingly, will not be described in further detail.

FIG. 23 also illustrates that the liquid flow meter 50 can be operated in a RESET mode. The RESET procedure performed by manipulating the buttons 164 and 166 in this mode is used to reset the microcontroller's counter and timer at initial filtration system installation or upon each incidence of filter cartridge replacement. The details of the RESET mode are believed to be self evident from blocks 196 and 198 in FIG. 23 and, accordingly, will not be detailed.

It is also possible at this time to use the RESET and DISPLAY buttons 164 and 166 in conjunction with one another to enter a CALIBRATE mode. When in this mode, the flow meter 50 can be calibrated to monitor flow of liquids of different, previously unknown viscosities in a very simple process. All that is required is to cause a designated, previously-known volume of the liquid to be calibrated to flow through the sensor assembly 74 while the number of pulses obtained for that volume are counted and stored in the microcontroller's memory. That information is all that is required to obtain the desired information regarding pulses per unit volume. To obtain optimal results in those applications in which higher-than-normal accuracy is required, the volume, temperature, and duty cycle under which the sample liquid is measured should occur under conditions similar to those projected to prevail under normal use of that liquid.

Before the specific display functions of the microcontroller/indicator assembly 76 are described in detail, the basic calculations performed by the microcontroller 162 will be detailed. As discussed above, whenever water or another liquid to be monitored flows through the turbine 82, the reed switch 84 and microcontroller 162 count one pulse for each turbine revolution. It is then a simple matter for the controller 162 to divide the number of counted pulses by the previously-stored pulses per gallon (either input in block 192 in FIG. 23 or determined during the CALIBRATE mode in block 200 and then input in block 192) to obtain an indication of the volume of liquid flowing through the sensor assembly 74. A running tally of the counted volume can then be used to store the aggregate volume of liquid that has flowed through the filter assembly 52 since the last RESET procedure. The counted pulses can also be used in conjunction with the timer to calculate the liquid flow rate through the liquid flow meter 50. The timer can also be used keep track of the total time since installation of the filter cartridge, i.e., since the last RESET procedure.

Figure 24:
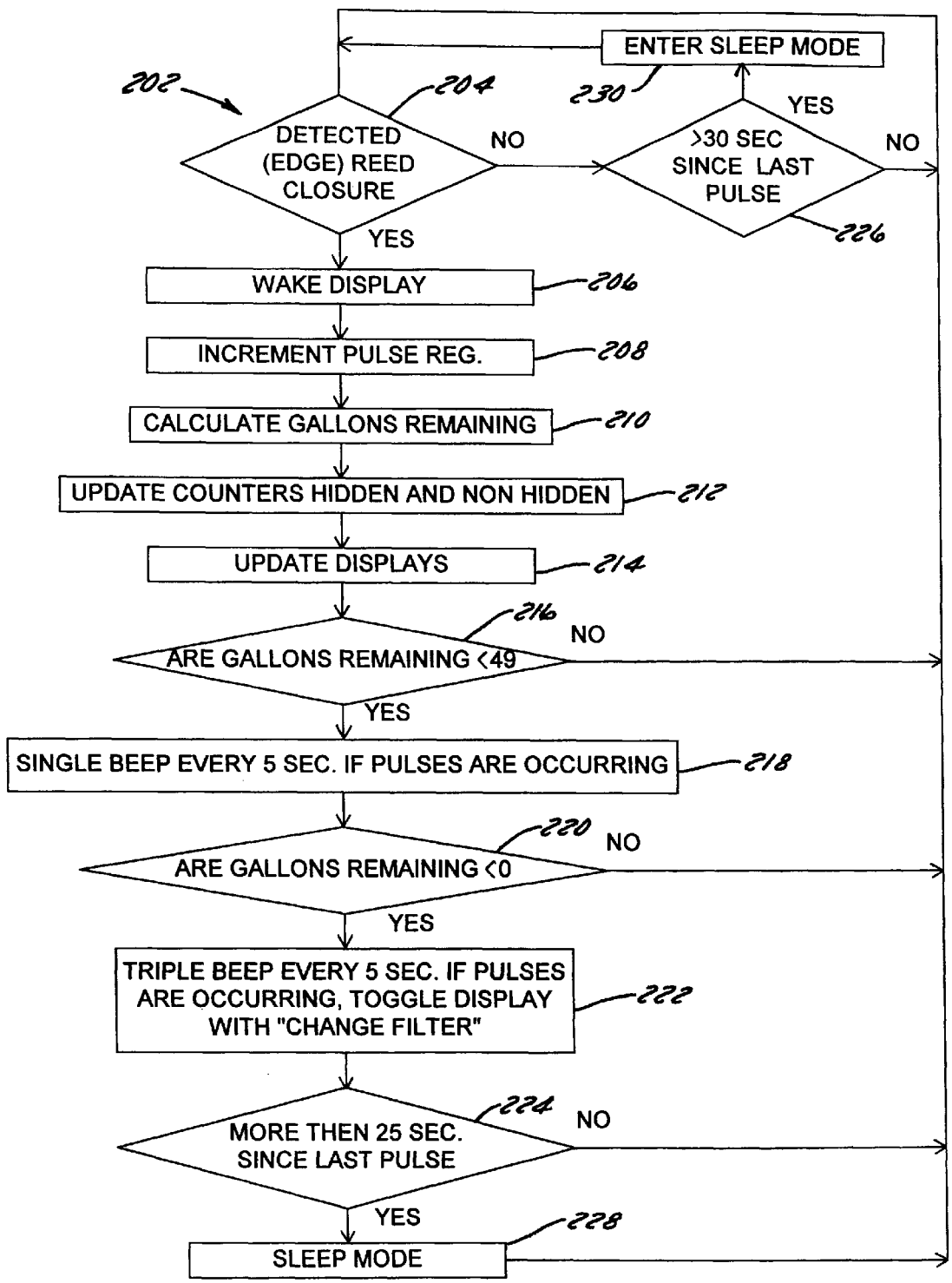

The specifics of some of the operations of the microcontroller 162 that can be performed based upon the above-described determinations will now be detailed with reference initially to the routine 202 of FIG. 24. Routine 202 illustrates that, whenever the filtration system 54 is not operating, i.e., when there is no liquid flowing through the filter assembly 52 for a designated period of time, the controller/indicator assembly 76 enters a SLEEP mode in which no LCDs or audio alarms are energized. Operation in this mode not only conserves battery power, but also instills confidence with the user that the flow meter 50 is operating. That is, the readings of some of the displays such as remaining gallons change only relatively infrequently. Users who do not witness any changes in display status for relatively long periods may begin to wonder whether or not the flow meter is operating properly. The wake-up procedure provides the desired display changes and informs the user that the flow meter is operating.

When the reed switch 84 detects a pulse in block 204, thereby indicating that liquid is beginning to flow through the flow meter 50, the displays are woken or activated in block 206 and the pulse registered in block 208. The microcontroller 162 then calculates the remaining useful volumetric capacity of the filter cartridge or cartridges in block 210 by subtracting the determined aggregate volume of liquid that has flowed through the liquid flow meter 50 since the last RESET operation from the previously-stored rated volumetric capacity. It then updates all counters and displays in blocks 212 and 214. In inquiry block 216, the routine 202 determines whether or not the determined volume is less than a designated volume (49 gallons in the illustrated embodiment) less than the filter cartridge's rated volumetric capacity as stored in the memory of the microcontroller 162 during the SET-UP procedure. If not, the routine 202 returns to inquiry block 204. If so, the microcontroller 162 energizes the audio alarm 168 in block 218 to beep cyclically (so long as pulses are being detected), and then inquires in block 220 whether or not the entire rated volumetric capacity of the filter cartridge has been used. If not, the routine 202 returns to inquiry block 204. If so, the frequency of the audio alarm's beeps are increased in block 222 for the duration of fluid flow and a "change filter" display is illuminated in the LCD display 170.

At some point, the flow of liquid through the filtration system 54 will cease, at which point the reed switch 84 will no longer generate pulses. If the reed switch 84 does not generate a pulse for more than a designated amount of time (either 25 seconds in block 224 or 30 seconds in block 226), the routine 202 will reenter SLEEP mode as seen in blocks 228 and 230.

Figure 25:
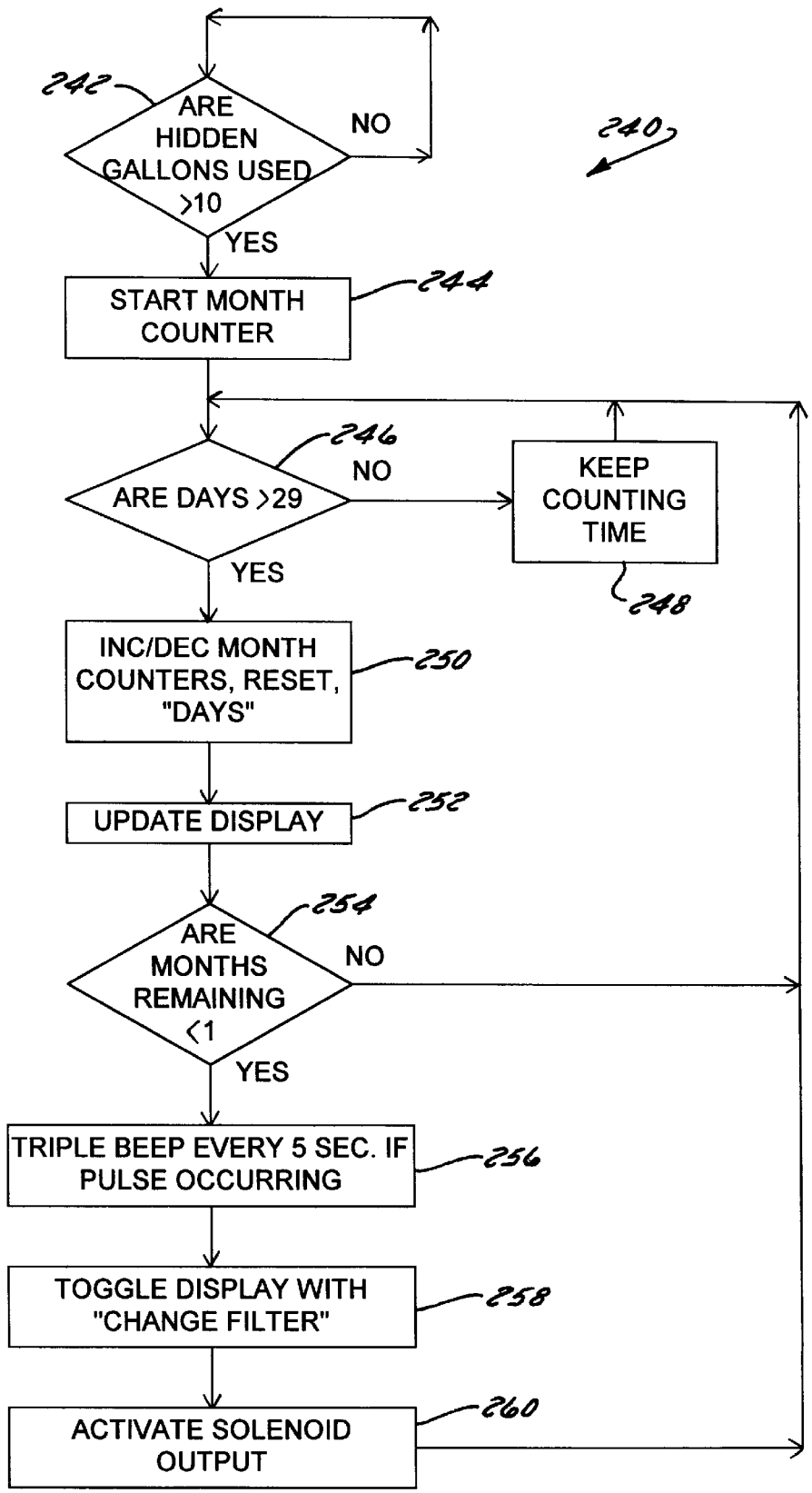

The microcontroller 162 preferably also is designed to compare the time since the filter cartridge was installed, i.e., since the last RESET operation, with a designated time indicative of the rated useful life of the filter cartridge. A routine 240 suitable for these operations is illustrated in FIG. 25. Routine 240 proceeds from start to block 242 in which it prevents a month counter (block 244) from starting unless more than 10 gallons of liquid has flowed through the flow meter 50 since initial filtration system installation (this function is not reset by a RESET operation). This subroutine prevents the month counter from running before the filtration system 50 has been installed and operated. Then, the routine 240 determines in inquiry block 246 whether or not more than 29 days (indicative of a month) has expired since the month counter has started. If not, the routine 240 proceeds to block 248 where it keeps counting time. If so, the month counter display is decremented in block 250, the "DAYS" are reset, and the displays are updated in block 252. Then, in block 254, the routine 240 determines whether or not the months remaining, i.e., the rated useful life minus the calculated number of months since the last RESET operation, is less than one. If not, the routine 240 returns to block 246. If so, blocks 256 and 258 trigger the audio alarm 168 and flashing of a "change filter" display in the LCD 170, and a solenoid output (used, for example, to trigger a shut-off valve) may be activated in block 260. The routine 240 then returns to block 246.

Day-to-day interactive operation of the liquid flow meter 50, including operation of the sensor and microcontroller/indicator assemblies 74 and 76, will now be detailed.

5. Operation Of Liquid Flow Meter

Figure 3:
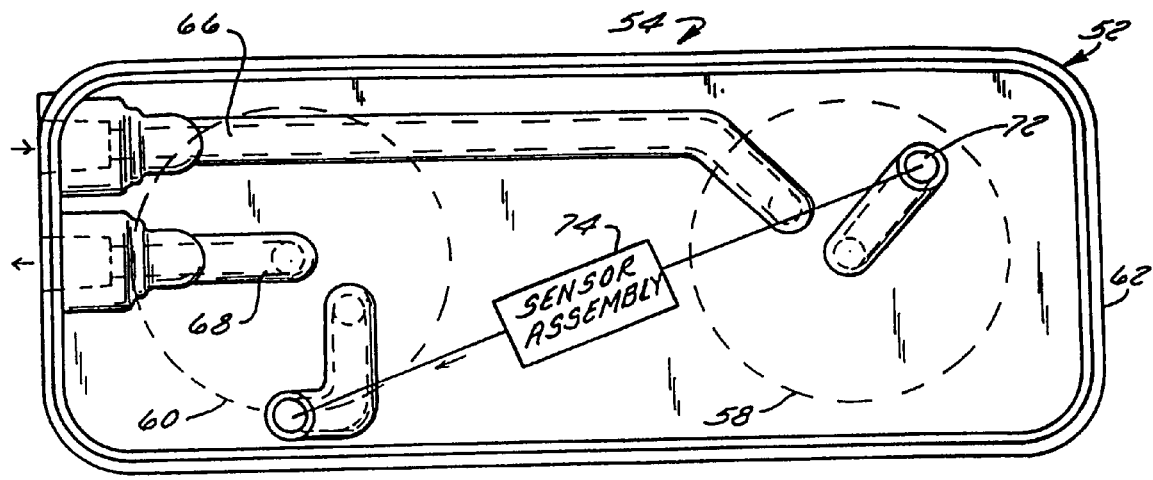
FIG. 3 is a partially schematic, cut-away top plan view of the filtration system of FIGS. 1 and 2.

Assuming that the filtration system 54 has been installed, calibrated, set-up, and reset, the microcontroller/indicator assembly 76 is placed in the SLEEP mode by routine 202 in the absence of liquid flow through the sensor assembly 74. When liquid begins to flow through the sensor assembly 74, i.e., from the first stage filter cartridge 58 to the second stage filter cartridge 60 as illustrated in FIGS. 1–3, liquid flow through the turbine 82 causes it to rotate. Turbine rotation results in the reed switch 84 and microcontroller 162 counting a number of pulses that increments directly with the volume of liquid flow through the sensor assembly 74. The microcontroller 162 then calculates aggregate liquid flow, liquid flow rate, time remaining, and volume remaining as detailed above.

Figure 20:
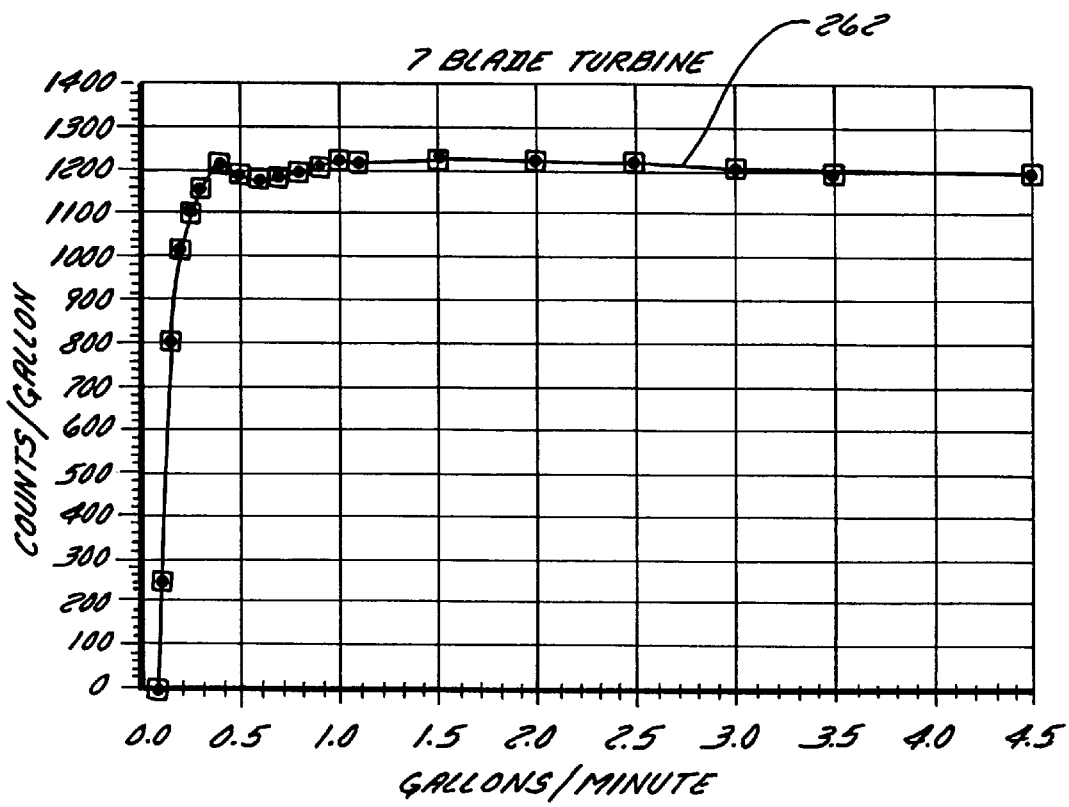
FIG. 20 is a graph of gallons per minute verses counts per gallon resulting from operation of the liquid flow meter of FIGS. 1–4.

As best seen by the curve 262 in FIG. 20, the design of the turbine 82 as detailed in Section 4 above assures linear operation so long as the flow rate of liquid through the sensor assembly 74 is between about 0.4 gallons per minute and 4.0 or even more gallons per minute. This 10:1 range of linearity is significantly higher than any other known flow meter. It has also been found that this 10:1 range of linearity is maintained even if different turbine geometries are selected to impose a different lower or upper end on the range of linearity.

Figure 21:
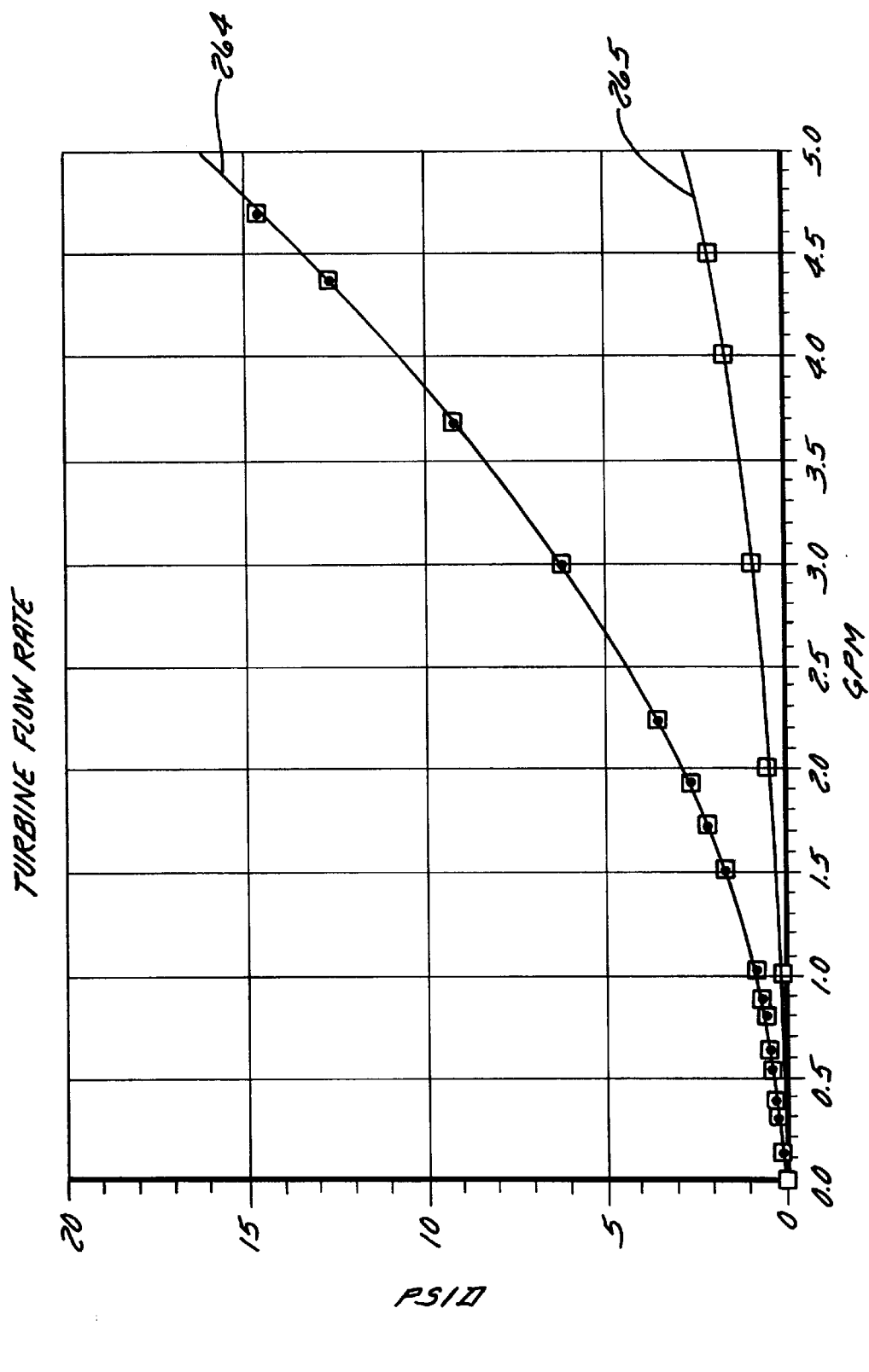
FIG. 21 is a graph of flow rate in gallons per minute verses pressure drop in pounds per square inch of the turbine of FIGS. 15–17.

The pressure drop occurring across the turbine 82 during operation is very small for the rated range of the liquid flow meter 50. Indeed, most of the pressure drop occurring during fluid flow through the flow meter 50 results from head losses in the turbine cartridge 80 and in the upstream and downstream sections of the tube 72 rather than from operation of the turbine. This fact can be demonstrated by comparing pressure drops in an arrangement in which the turbine cartridge 80 is fed with water by a relatively small diameter tube to an arrangement in which the turbine cartridge 80 serves as the only enclosed stream for the monitored liquid. Hence, curve 264 in FIG. 21 illustrates that the pressure drop through the assembly is less than about 2.7 psi at a flow rate of 2.0 gallons per minute and less than 0.4 psi at a flow rate of 0.4 gallons per minute when the turbine cartridge 80 is connected to upstream and downstream sections of tubing having an ID of 0.25" (even these pressure drops are substantially less than those found in the arrangement described in the Silverman patent and other previously available arrangements). Curve 265 demonstrates that these pressure drops fall dramatically when flow occurs though tubing having an ID of 0.56" (the effective ID of the turbine cartridge) ranging about 0.5 psi at a flow rate of 2.0 gallons per minute to a negligible amount of less than 0.1 psi at a flow rate of 0.4 gallons per minute.

The determined information can be displayed as desired by toggling the DISPLAY button 166 as illustrated in FIG. 22. The number of displays that are available depend upon whether the microcontroller/indicator assembly 76 is set-up to display in the BASIC display mode or in the ADVANCED display mode (see the description of FIG. 23 in Section 4 above). In either mode, the assembly 76 initially displays the remaining volumetric capacity of the filter cartridge, both by displaying a numerical value and by illuminating a number of water droplets that decreases with deceasing remaining capacity of the filter cartridge (see blocks 270 and 276). In the BASIC display mode, toggling the DISPLAY button 166 once will cause the assembly 76 to display the remaining rated life of the monitored filter cartridge in months (block 272), and toggling the DISPLAY button 166 again will cause the assembly 76 to indicate liquid flow rate through the sensor assembly 74 both by the display of a numerical value and by the scrolled filling of the water droplets (see block 274). The rate of scrolling is proportional to the flow rate of liquid through the flow meter 50. If the ADVANCED mode is chosen during set-up, successive toggling operations will trigger display of used volumetric capacity, the rated volumetric capacity of the filter cartridge, the remaining rated useful life of the filter cartridge in months, and liquid flow rate, respectively (see blocks 278, 280, 282, and 284, respectively).

The above-described display operation assumes that the microcontroller/indicator assembly 76 is set-up to monitor a one-filter cartridge filtration system. If the assembly is set-up to monitor a two-filter cartridge filtration system, additional toggling operations will trigger displays relating to the second filter cartridge of the system.

It can thus be seen that the liquid flow meter 50 is relatively simple, compact, and versatile and yet precisely monitors liquid flow over a wide operational flow-rate range with minimal pressure drops and minimal power consumption. Of course, many changes and modifications could be made to the liquid flow meter 50. For instance, in addition to performing the functions described above, the flow meter could generate and display a warning signal if the detected flow rate is above an acceptable threshold. This in turn would help prevent use of the filter when it cannot effectively treat water, if, for instance, the filtration system is connected to an unacceptably high pressure source or if a component of the filtration system has failed so as to permit at least some of the water to bypass the filter element(s). Some changes will now be detailed.

6. Alternative Configurations

As discussed above, one of the advantages of the turbine cartridge 80 is that it is easily adapted for use in a wide variety of systems. For instance, rather than being inserted in a separate housing between two cartridges of a multi-cartridge filter assembly as illustrated in FIGS. 1–3, it could be incorporated directly into a filter assembly having a relatively rigid base such as the countertop filter assembly 352 of the filtration system 354 seen in FIG. 26. The filter assembly 352 includes a base 356 configured for mounting on a countertop 353 and a single filter cartridge 358 extending upwardly from the base 356. Raw water is supplied to the filter assembly 352 from a supply tube (not shown), and treated water is discharged from the filter assembly 352 by a spigot 368 that is connected to the outlet of the filter cartridge 358 by an internal passageway 357 in the base 356. It is in this internal passageway 357 that the turbine cartridge 82 of the liquid flow meter 50 is inserted. This sensor assembly differs from the sensor assembly 74 discussed above only in that it lacks a cartridge housing. Rather, support for the turbine cartridge 80 is provided by the walls of the passageway 357 in which the turbine cartridge 80 is inserted. The reed switch (not shown) is mounted either in the base 356 adjacent the turbine 82 as in the first embodiment.

The only other variation of the filtration system 354 of the second embodiment as compared to the first embodiment is a reorientation of the microcontroller/indicator assembly 76 such that the assembly 76 is upright when the filter assembly 354 is supported on the countertop 353 as illustrated.

Another modification to the flow meter may constitute the use of a slightly different turbine 382 as illustrated in FIGS. 27 and 28. Turbine 382 is designed to facilitate use of the flow meter in applications in which linearity of measurement is desired at flow rates of as low as 0.2 gallons per minute or less (as are found in many countries other than the United States). This turbine 382 has the same components as the turbine 82 of the first embodiment. These components therefore are designated by the same reference numerals, incremented by 300. The turbine 382 differs from the turbine 82 of the first embodiment only in that 1) it has a thicker hub 440 and hence a smaller annular space 446 between the hub 440 and the ring 442, and 2) its blades 444 extend at a different angle. Specifically, the hub 440 has a diameter of 0.320" as opposed to the 0.220" diameter of the hub 140 of the turbine 82 of the first embodiment, and the annular space 446 therefore has a diameter of 0.04" as opposed to 0.09" as in the previous embodiment. The smaller annular space 446 increases the liquid flow velocity through the turbine 382 and hence permits relatively slow-flowing liquids to generate enough torque to rotate the turbine 382. Torque is increased further by increasing the initial angle a of blade pitch from 30° to 36°. The use of a smaller space 446 and more steeply-pitched blades necessarily results in a higher pressure drop across the turbine. However, as demonstrated above with respect to FIG. 21, this pressure drop is still much smaller than pressure drops due to head losses in other components of the flow meter.

Figure 29:
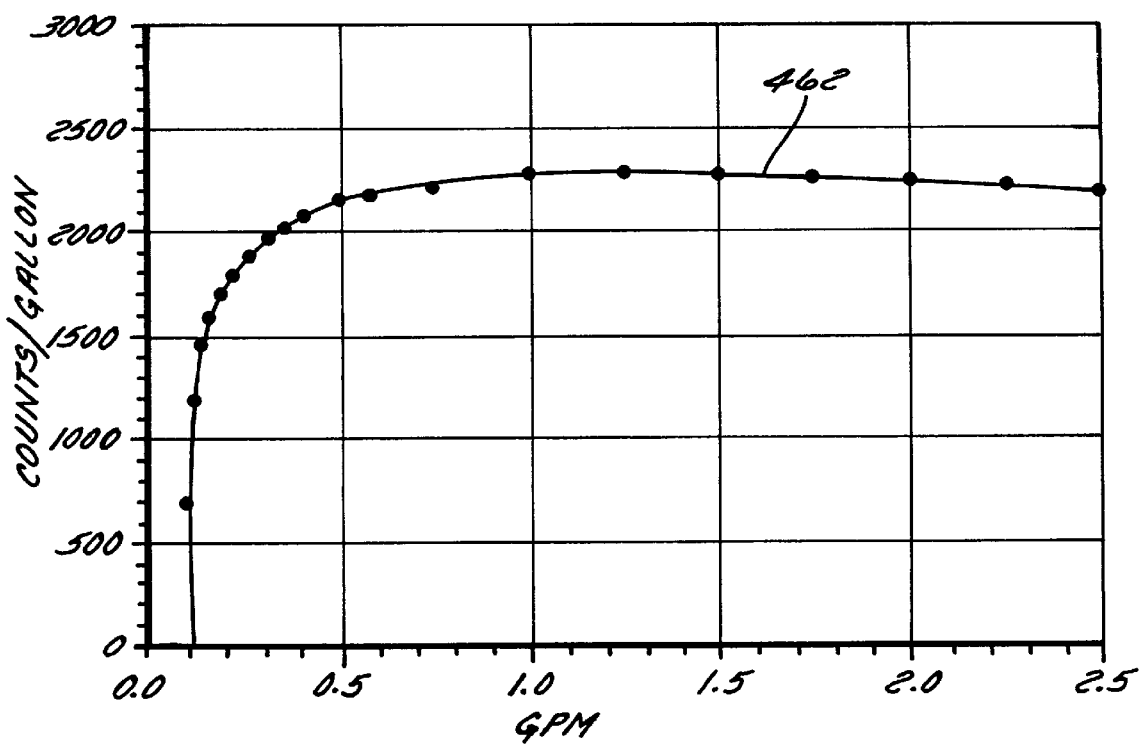
FIG. 29 is a graph of flow rate in gallons per minute verses pressure drop in pounds per square inch of the turbine of the filtration system of FIGS. 26–28.

As best seen by the curve 462 in FIG. 29, the design of the turbine 382 assures linear operation so long as the flow rate of liquid through the sensor assembly is between about 0.26 gallons per minute and about 2.0 to 3.0 gallons per minute. This range of linearity is significantly wider than with other known flow meters and is only slightly narrower than the range of linearity experienced by the flow meter 50 of the first embodiment. Moreover, the lower end of linear flow range (0.25 gallons per minute) is significantly lower than with any other known flow meter.

7. Filter Cartridge Capable of Confirmation Signal Transmission and Filtration System Useable Therewith The filtration systems discussed in Sections 3–6 above generate and transmit electronic signals that permit the display of information indicative of one or more operational characteristics of the system. Signals also can be transmitted and received that confirm the installation of a filter cartridge in a filtration system that is properly configured for use in the system. One or more operational characteristics of the filtration system can then be controlled based on the acquisition or non-acquisition of the filter cartridge presence confirmation signal. A filtration system having this capability and a filter cartridge useable therewith now will be detailed.

Figure 30:
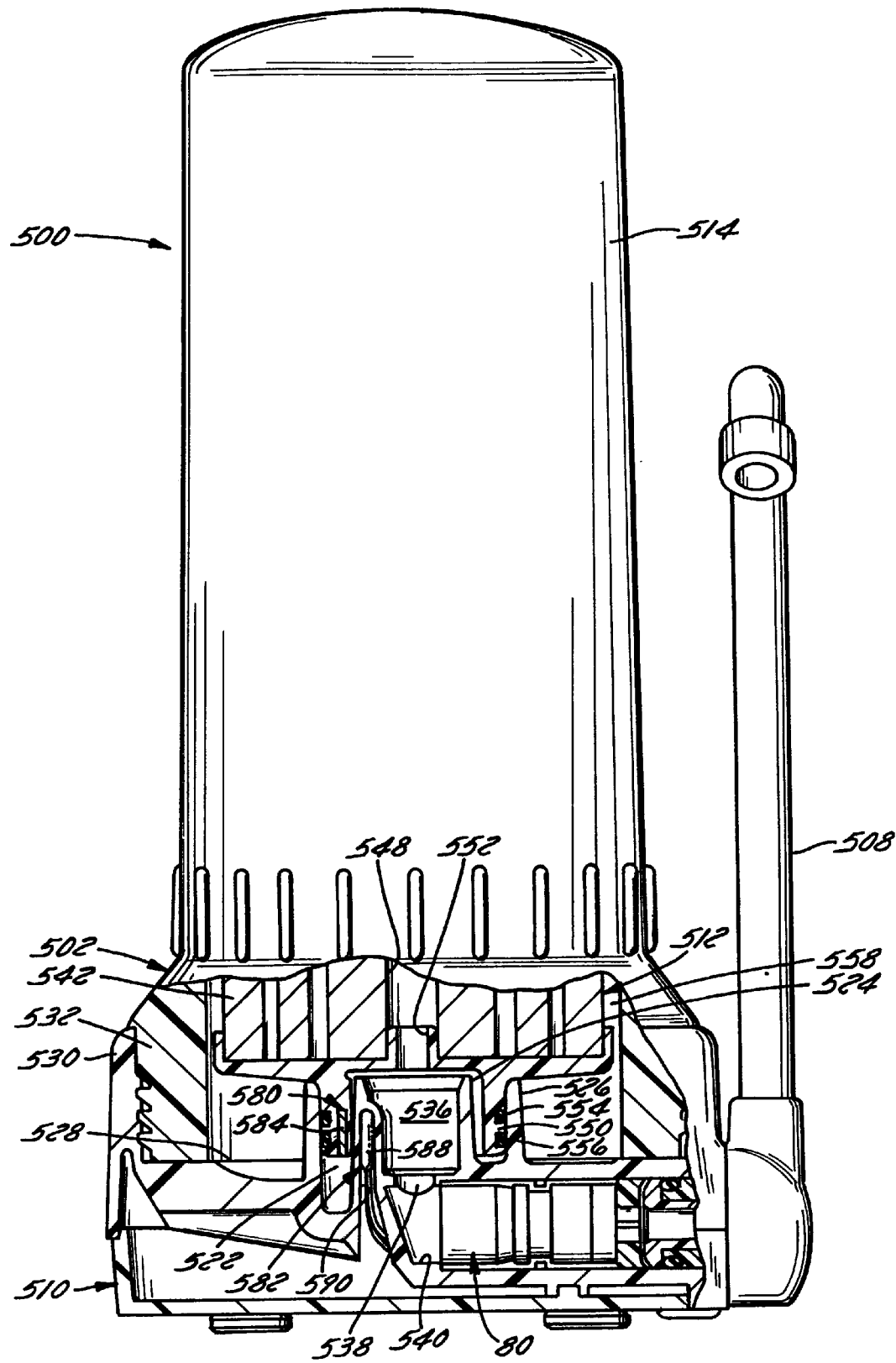
FIG. 30 is a partially cut-away side elevation view of a filtration system constructed in accordance with a third preferred embodiment of the invention.
Figure 31:
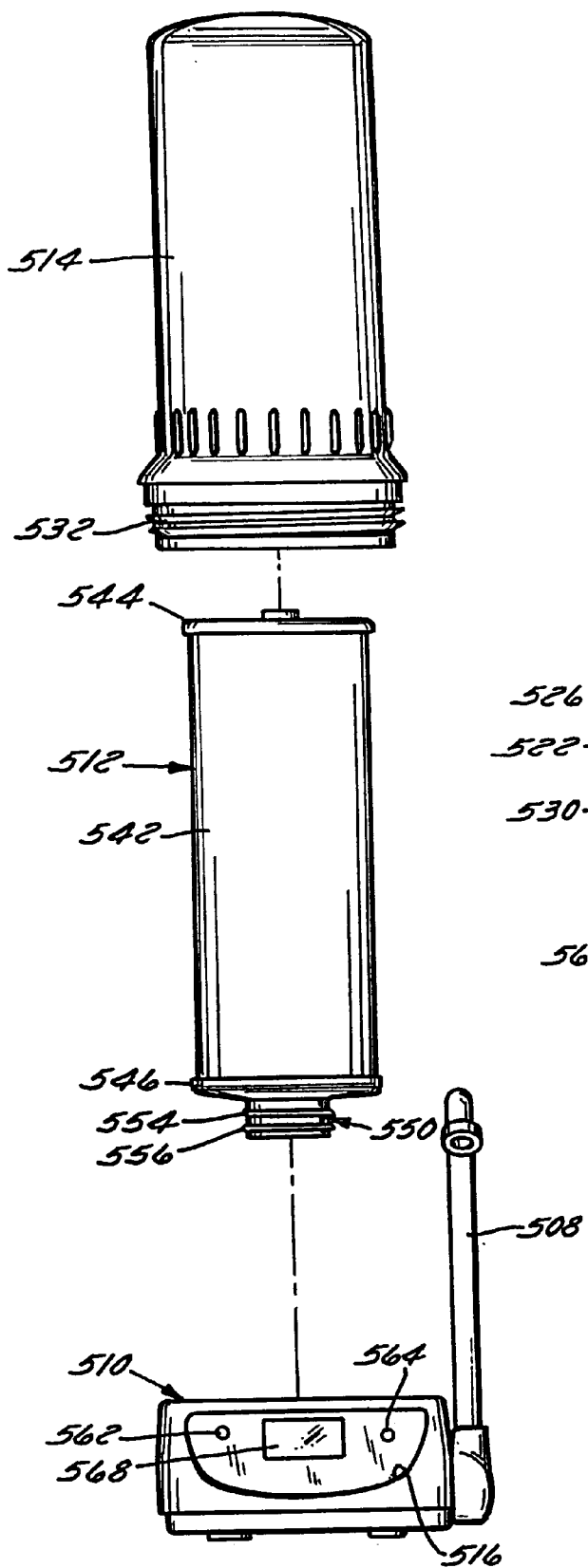
FIG. 31 is an exploded elevation view of the major components of the filtration system of FIG. 30.
Figure 32:
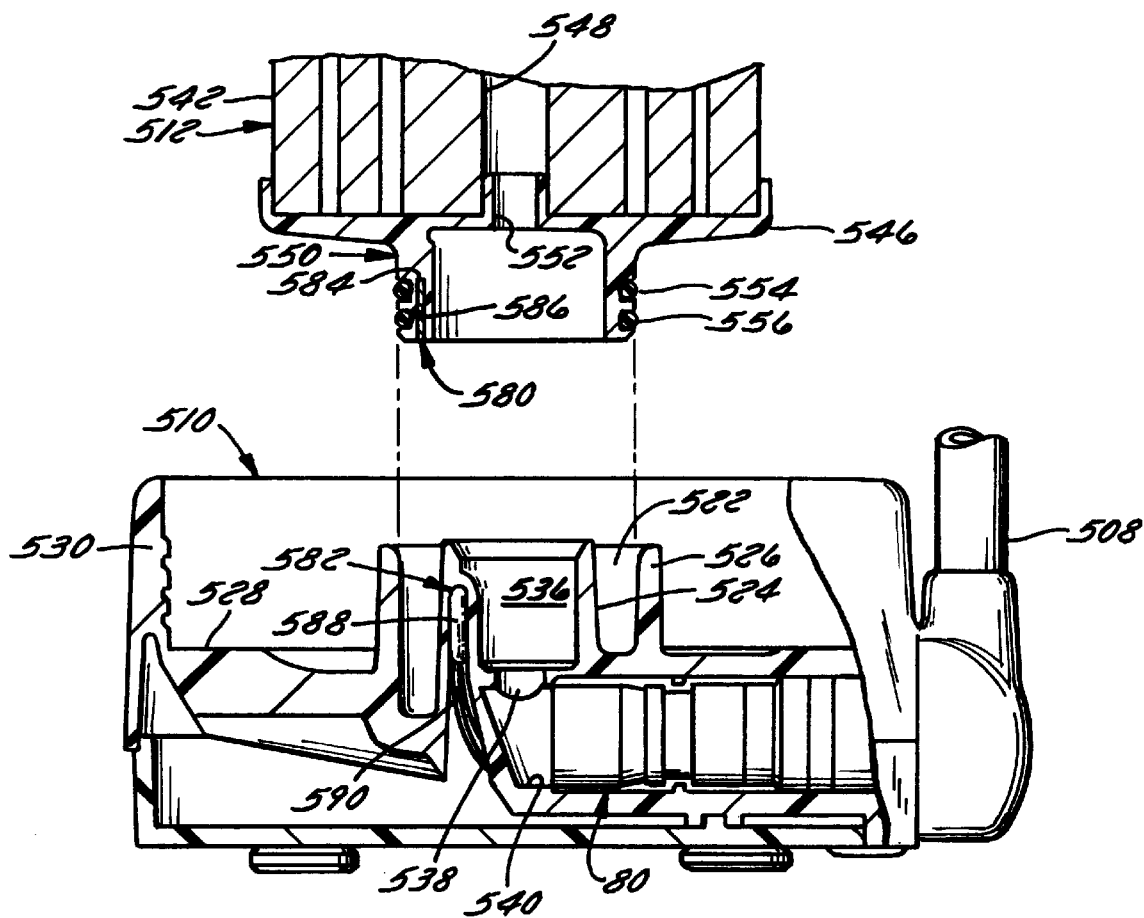
FIG. 32 is an enlarged sectional elevation view of a portion of the filter cartridge and the mating portions of the base of the filtration system of FIGS. 30 and 31.

Referring to FIGS. 30–34, a filtration system 500 is illustrated that includes a countertop filter assembly 502, a microcontroller/indicator assembly 504 (FIG. 34), and a flow meter. The flow meter, a sensor assembly 74 of which includes a turbine 82 and a reed switch 84, is identical in construction and operation to the flow meter described in Section 6 above and hence will not be described in detail. Raw water is supplied to the system 500 from a supply tube 506 (FIG. 33), and treated water is discharged from the system 500 by a spigot 508 (FIGS. 30–32).

The filter assembly 502, best seen in FIGS. 30–32, includes 1) a base or head 510 configured for mounting on a countertop and 2) at least one filter cartridge 512 extending upwardly from the base 510. In the illustrated embodiment, the filter cartridge 512 is enclosed by a sump 514 that sealingly-houses the filter cartridge 512 and that is threadedly attached to the base 510. It should be understood, however, that the sump 514 could be combined with the filter cartridge 512 and/or eliminated entirely if the filter cartridge 512 were to comprise a sealed unit having separate inlet and outlet orifices.

Figure 33:
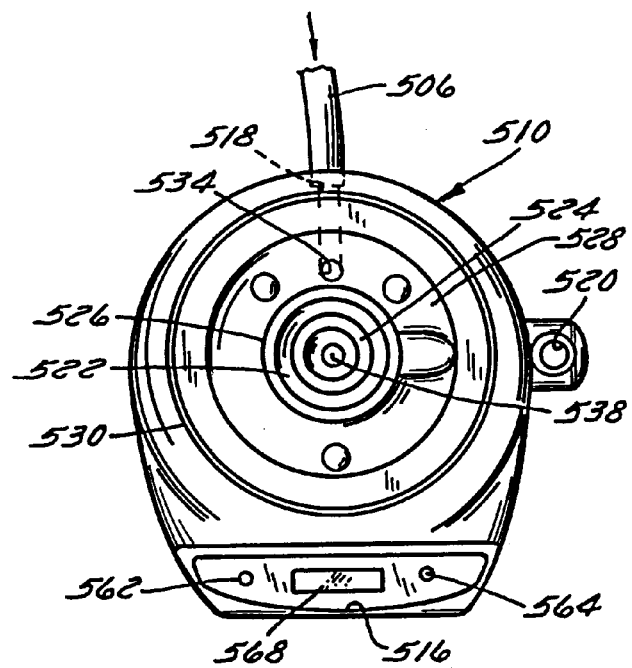
FIG. 33 is a top plan view of the base of the filtration system of FIGS. 30–32.

The base 510 is, save for the incorporation of a detector for the acquisition of a filter cartridge presence conformation signal, identical to the base 356 discussed in Section 6 above. The base 510 includes a receptacle 516 for the microcontroller/indicator assembly 504, inlet and outlet ports 518 and 520, and a socket 522. The socket is formed from radially-spaced inner and outer concentric rings or tubular members 524 and 526 extending upwardly from an upper surface 528 of the base 510. A threaded boss 530 extends upwardly from the outer radial periphery of the base 510 for mating connection with a threaded bottom end 532 of the sump 514. An untreated water inlet orifice 534 is formed in the upper surface 528 radially beyond the outer concentric tubular member 526 and, as best seen in FIG. 33, extends radially through the base 510 to the inlet port 518. A treated water flow passage 536 is formed within the inner tubular member 524 and terminates in an orifice 538 formed in the upper surface 528. As best seen in FIG. 30, this orifice 538 opens into an internal passageway 540 in the base 510 in which is disposed the turbine cartridge 80 of the liquid flow meter. The outlet of the passageway 540 opens into the outlet port 520 for the discharge of treated water from the system 500 via the spigot 508.

The filter cartridge 512 may comprise any cartridge which is capable of mating engagement with the socket 522 and of treating potable water or another liquid. The filter cartridge 512 could, for instance, comprise an enclosed cartridge having only a membrane, a carbon block, or a granulated medium. The illustrated filter cartridge 512 is a composite filter including a composite filter element 542 and first and second end caps 544 and 546. The composite filter element 542 preferably comprises several different sublayers including a radially-central carbon block, an intermediate ceramic layer, and an outer sediment layer membrane through which water may flow. A treated water collection/discharge passage 548 extends axially through the center of the filter element 542 for the collection of treated water and for the conveyance of treated water out of the filter cartridge 512. The first and second end caps 544 and 546 are both formed from unitary injection-molded plastic elements sealingly affixed to a respective one of the first and second ends of the filter element 542. The first end cap 544 is imperforate. The second end cap 546 has a tubular post 550 which is formed integrally with the body thereof and which extends axially outwardly (or downwardly in the drawings) from the body of the second end cap for mating engagement with the socket 522 in the base 510. An orifice 552 is formed axially through the second end cap 546 and into the interior of the post 550 for the flow of treated water between the collection/discharge passage 548 of the filter element 542 and the interior of the post 550. Leakage of treated water past the post 550 is prevented via a pair of axially-spaced O-ring seals 554 and 556 which are mounted in respective circumferential grooves formed in the outer peripheral surface of the post 550 and which seal against the inner surface of the outer concentric tubular member 526 of the base 510.

Figure 34:
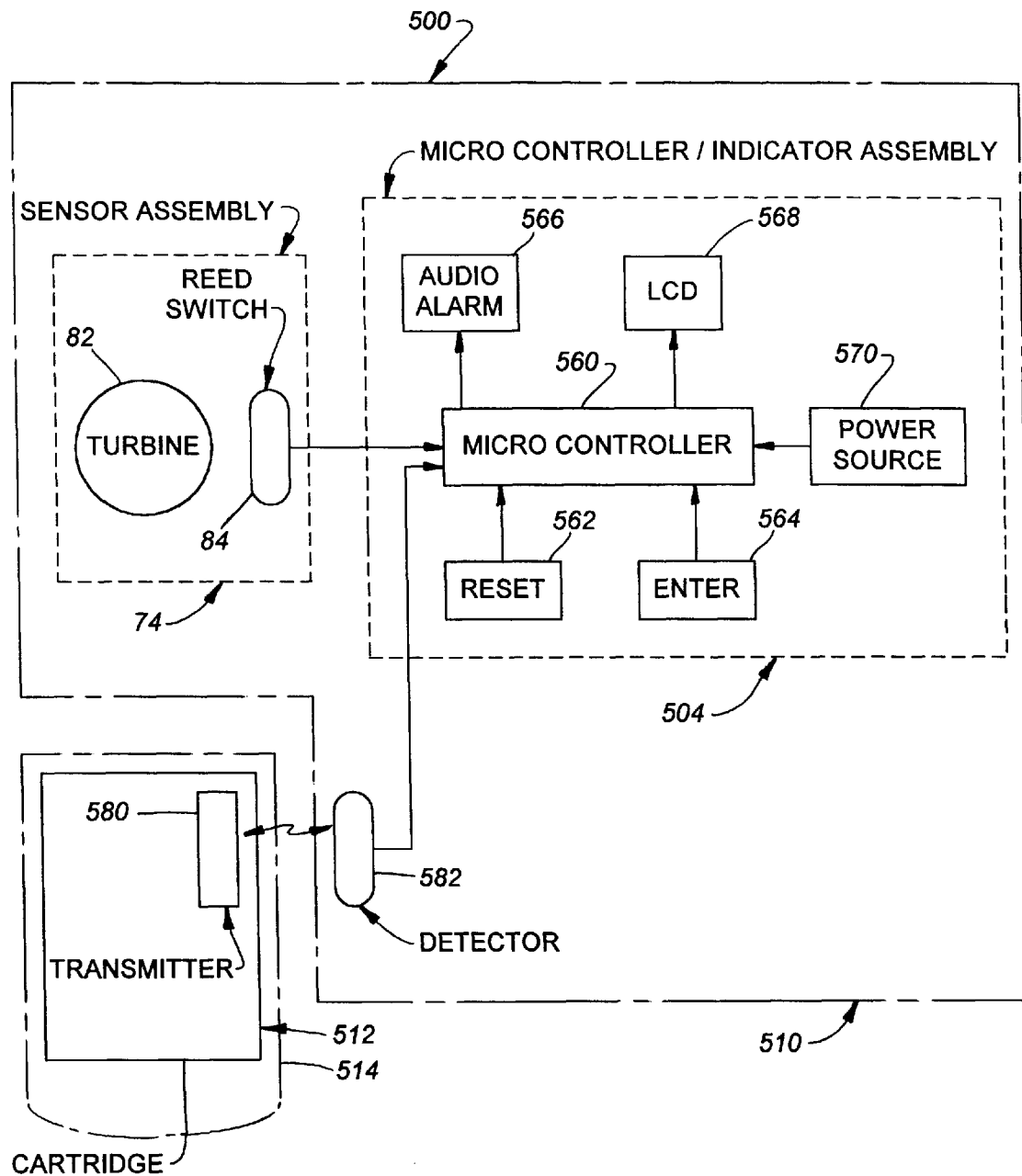
FIG. 34 schematically illustrates the electronic components of the filtration system of FIGS. 30–33.

Apart from receiving and reacting to a filter cartridge presence confirmation signal, the microcontroller/indicator assembly 504 is identical to the corresponding microcontroller/indicator assemblies of the previous embodiments. As best seen in FIG. 34, the assembly 504 includes a computer or microcontroller 560, a reset button 562, a display button 564, an audio alarm 566, and a visual indicator 568. The visual indicator 568 preferably comprises one or more LCDs or the like disposed on the face of the display device as seen in FIG. 31. A power source 570 such as a battery supplies power to the microcontroller 560, the audio alarm 566, the visual indicator 568, the reed switch 84 of the sensor assembly 74, a filter cartridge presence confirmation signal detector 582 (detailed below), and all other electrically powered components of the assembly 504.

The microcontroller 560 may include a conventional microprocessor which incorporates or operates in conjunction with one or more counters and one or more timers. Microcontroller 560 also includes drivers (not shown) for selectively illuminating one or more of the elements of the visual indicator 568. As with the previous embodiments, the microcontroller/indicator assembly 504 may also contain one or more drivers for external displays—an important feature in some applications in which the filtration system is located in a relatively non-accessible location.

In use, raw or untreated water flows into the filter assembly 502 from the tube 506 and the inlet orifice 518 and then flows upwardly into an annular space 558 formed between the sump 514 and the outer peripheral surface of the filter element 542. Pressure in this space 558 forces the water radially through the filter element 542 which removes impurities from the water to produce treated water. The treated water flows from the collection/discharge passage 548, out of the orifice 552, through the post 550, through the treated water flow passage 536, through orifice 538, and into the passageway 540. Water in the passageway 540 then flows through the turbine 82 (FIG. 34), thereby permitting fluid flow monitoring and display using the microcontroller/indicator assembly 504. Treated water then is discharged from the filtration assembly via the spigot 508. As in the previous embodiments, the microcontroller 560 of the microcontroller/indicator assembly 504 is programmed to count pulses delivered by the reed switch 84 of the sensor assembly and to calculate and to selectively display information concerning 1) the aggregate volume of liquid that is flowed through the flow meter 74 since counting began, 2) the flow rate of liquid through the flow meter 74, and 3) the elapsed time since timing began. Routines for performing these function were discussed above in conjunction with FIGS. 22 through 25 and are equally applicable to this embodiment of the invention.

Pursuant to the invention, measures are taken to permit the selective transmission and receipt of a filter cartridge presence confirmation signal to permit the microcontroller/indicator assembly 504 1) to ascertain whether or not a properly-configured filter cartridge 512 is installed in the filtration system 500 and 2) to react accordingly. The filter cartridge presence confirmation signal could be transmitted in a variety of ways. For instance, an electrical contact could be mounted on the post 550 or the body of the end cap 546 of the filter cartridge 512 for selective electrical communication with a mating contact on the base 510. An optical or RF reflector also could be mounted on the post 550 or at some other location on the filter cartridge 512. This reflector would reflect a signal, transmitted from a corresponding transmitter on the base 510, back to a suitable receiver on the base 510. In the presently-preferred embodiment, filter cartridge presence confirmation signals preferably are generated, transmitted, and received via a transmitter/detector which cannot contaminate liquid flowing through the filter assembly 502 and the operation of which is not affected by liquid flow through the filter assembly. A particularly sophisticated RF-based system could incorporate a reductive or inductive key for additional data transmission. A magnetic field generator/detector assembly is preferred. The illustrated assembly includes 1) a magnetic field generator 580 mounted on the filter cartridge 512 and 2) a magnetic field detector 582 mounted on the base 510.

The magnetic field generator 580 (sometimes referred to herein as a "transmitter" because it transmits or projects a magnetic field) comprises a permanent magnet 584 which is mounted on a suitable location of the filter assembly for interaction with the detector. In the illustrated embodiment, the transmitter 580 is embedded in a bore 586 formed axially into the outer or lower axial surface of the post 550. In order to inhibit impurities from the magnet from potentially leeching into the treated water, the outer end of the bore 586 is sealed from the treated liquid via application of an epoxy, sonic welding, potting, or otherwise. The thus-configured magnet 584 is isolated from fluid flow through the system 500 but generates a magnetic field which extends beyond the post 550 and into the base 510.

The magnetic field detector 582 is disposed at a location within the base 510 in which it is capable of acquiring the magnetic field generated by the magnet 584 when a properly-configured filter cartridge 512 is fully-installed on the base 510, i.e., when the post 550 is fully-inserted into the socket 522. The detector 582 preferably includes a reed switch 588 mounted in an axial bore 590 extending into the inner concentric tubular member 524 from below. A reed switch is preferred because reed switches 1) have low power requirements when compared to Hall effect sensors and 2) provide dependable operation for many cycles. However, it is conceivable that a Hall effect sensor or some other magnetic field detector could be used in place of the reed switch 588. In fact, a Hall effect sensor may be preferred if 1) a Hall effect sensor were available that could be used in a battery-powered system, or 2) cost or power requirements are not a concern. As is conventional, the reed switch 588 closes in the presence of a magnetic field of a designated strength and/or orientation and generates an electrical signal upon its closure.

The generator or transmitter 580 and detector 582 preferably assume a "lock and key" relationship so that a filter cartridge presence confirmation signal will not be acquired by the detector 582 unless the filter cartridge 512 is one which matches the base 510, i.e. is one which is properly-configured for the application in question. Use of a lock and key relationship between the transmitter 580 and the detector 582 can prevent or at least inhibit use of an improperly-configured filter cartridge in the filtration system 500. For instance, if the base 510 and microcontroller/indicator assembly 504 are configured for use with a filter cartridge having a relatively high filtration capacity of, e.g., 2,000 gallons, the filtration system 500 preferably should be configured to discourage use of a filter cartridge that is dimensionally identical to the properly-configured filter cartridge 512 but that has a lower capacity of, e.g., 1,000 gallons. Use-of a lock and key relationship will prevent a signal from a transmitter of a low-capacity filter cartridge from being acquired by the detector of a head or base configured for use with a high-capacity filter cartridge. As another example, a lock and key configuration could be used to prevent the acquisition of a signal from a filter cartridge having a first filtration medium (e.g., granulated carbon) that is improperly installed in a filter assembly designed for use with a filter cartridge having a second filtration medium (e.g., a membranous element).

Cartridge matching could be assured via a variety of lock and key arrangements. For instance, a first orientation of the magnet 584 could be required for signal acquisition for a first type of filter cartridge. A reverse reed switch orientation could be used for signal acquisition for a different type of filter cartridge (e.g., one having a different filtration capacity or a different filtration medium).

As another example, multiple reeds could be mounted at specific locations on the base to accommodate unique magnet/reed combinations in order to permit a single base to accommodate two or more different filter cartridge ratings and could implement different display or monitoring functions depending upon which reed switch is closed by cartridge installation. For instance, the filter assembly's base could be configured with first and second axially-spaced reed switches. A particular filter cartridge would include a single magnet configured to close a predesignated one of these reed switches upon filter cartridge installation. The filtration system's electronics could be configured 1) to construe the closure of the first reed switch as the installation of a filter cartridge rated for removing VOCs from 400 gallons of water, and 2) to construe the closure of the second reed switch as the installation of a filter cartridge rated for the removal of lead from 2,000 gallons of water (in fact, the same filter cartridge could have both ratings because many cartridges have different rated capacities for different impurities). The system's GALLONS REMAINING counter therefore would count downwardly from 400 gallons or 2,000 gallons, depending on which of the first and second reed switches is closed. The cartridge manufacturer will base its decision as to magnet location selection within the filter cartridge (and, hence, its decision on which reed switch to close upon filter cartridge installation) on the perceived criticality of removing VOCs relative removing lead.

Still other possible lock and key configurations include the use of transmitters of different strengths and/or detectors of different sensitivities in different applications.

Optimal detector operation will require radial alignment between the transmitter 580 and the detector 582. This alignment could be facilitated via a variety of techniques. For instance, an "orientation key" could be incorporated into the design that precludes insertion of the post 550 into the socket 522 unless the transmitter 580 is radially aligned with the detector 582. The orientation key could comprise a radial bulge (not shown) which is formed on the inner radial periphery of the post 550 and which is slidably mateable with a corresponding groove or slot (also not shown) in the outer peripheral surface of the inner concentric tubular member 524.

Figure 35:
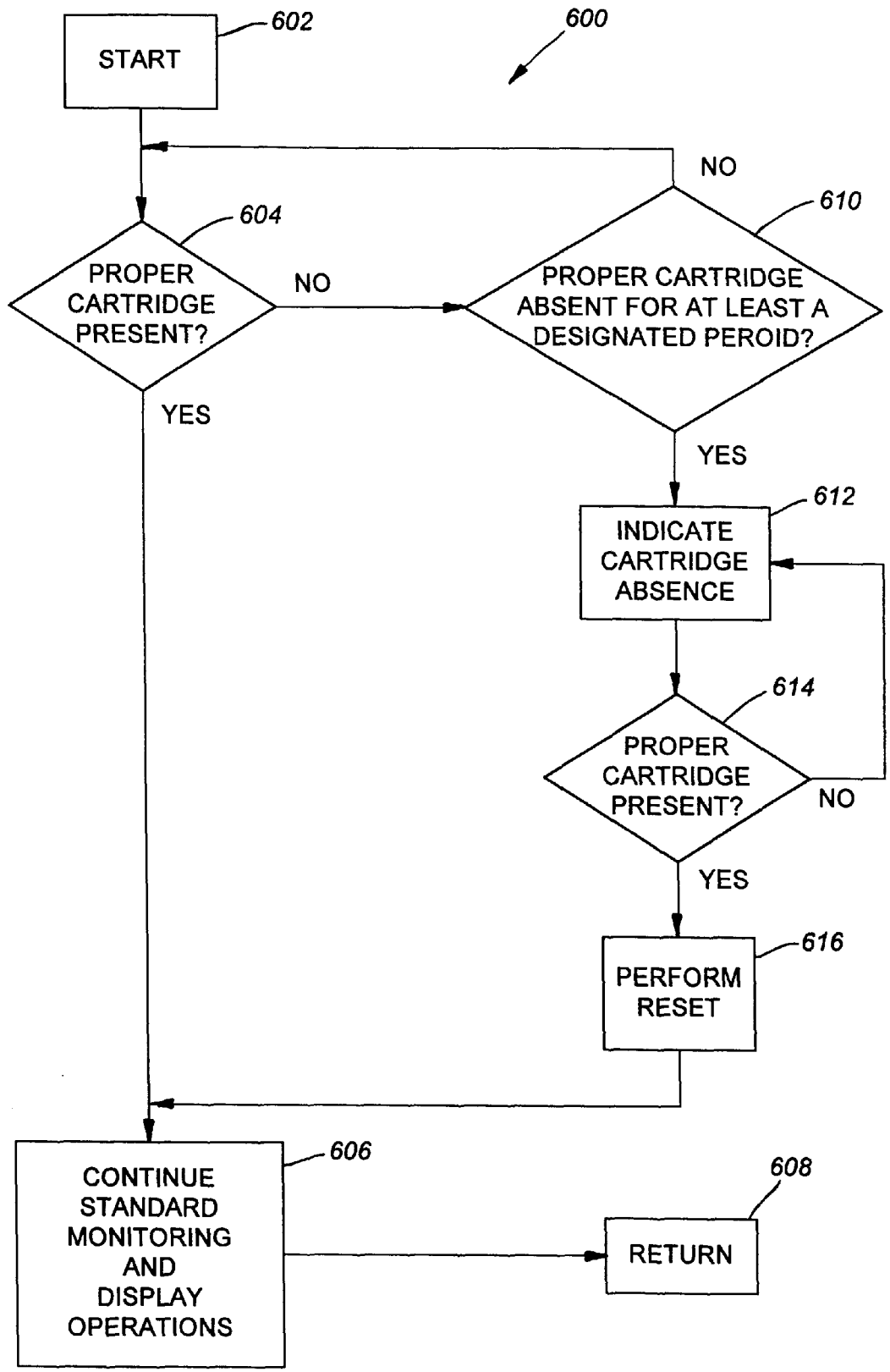
FIG. 35 is a flowchart of a cartridge presence interrogation routine employable by a microcontroller of the liquid flow meter of the filtration system of FIGS. 30–34.

The microcontroller/indicator assembly 504 receives a filter cartridge presence confirmation signal from the detector 582 and overrides normal counting and display operations in the absence of a filter cartridge presence confirmation signal from the detector 582. The microcontroller 560 may also operate in conjunction with the timers to be capable of detecting filter cartridge replacement and of effecting an automatic reset operation. A cartridge presence interrogation routine 600 suitable for performing these functions now will be described with reference to FIG. 35.

Routine 600, which preferably is performed continuously for so long as power is supplied to the microcontroller 560 by the power source 570, proceeds from START in block 602 to block 604 in which an inquiry is made as to whether or not a properly-configured filter cartridge 512 is installed in the filtration system 500. As should be apparent from the above-discussion, this inquiry will receive a YES answer if the reed switch 588 of the detector 582 closes in response to the detection of a magnetic field of pre-designated characteristics. A YES response to the inquiry of block 604 will cause the routine 600 to proceed to block 606 to cause the microcontroller/indicator assembly 504 to continue with standard monitoring and display operations described in Section 4 above. The routine 600 then proceeds to RETURN in block 608 and is repeated.

If, on the other hand, the reed switch 588 is open so that the routine 600 determines in the initial inquiry block 604 that a properly-configured filter cartridge is not installed in the filtration system 500, then an inquiry is made in block 610 as to whether or not a properly-configured filter cartridge has been absent from the system 500 for at least a designated time period of, e.g., 10 seconds. This delay in responding to filter cartridge absence helps prevent erroneous "cartridge replacement" responses if the filter cartridge 512 is jostled or inadvertently removed from the filtration system 500 for brief periods of time. If the answer to the inquiry of block 610 is YES, thus indicating that the filter cartridge 512 has been removed from the filtration system 500 or has never been inserted in the system 500, then a signal is transmitted to the display 568 in block 612 to provide an indication of cartridge absence. This indication could comprise an audio alarm and/or a visual "INSERT PROPER CARTRIDGE" or similar display. Then, in block 614, an inquiry is made as to whether or not a properly-configured filter cartridge is present in the filtration system 500, and the blocks 612 and 614 are repeated for so long as a properly-configured filter cartridge is not present. If the answer to the inquiry of block 614 is YES, thus indicating that a properly-configured filter cartridge 512 has been installed in the filter assembly 502, relevant counters such as a MONTHS counter and/or a GALLONS counter are reset in block 616, and monitoring resumes in the standard fashion in block 606. The routine 600 then proceeds to RETURN in block 608.

Many changes and modifications could be made to the invention without departing from the spirit thereof.

For instance, as discussed above, the filter cartridge presence confirmation signal could be transmitted and received by transmitter/detector assemblies other than the disclosed magnet/reed switch assembly. It is even conceivable that the filtration system could be configured for two-way communication. Limited two-way communication may be achieved using multiple-reed lock-and-key configurations as described above to adjust the display or monitoring operations of a filtration system to a filter cartridge's capacity and/or capabilities. More complex communications could permit data regarding filtered fluid volume, filtration period, etc. to be recorded on a magnetic card or some other device mounted within the filter cartridge 512. The stored information could then be acquired by the manufacturer for evaluation upon the return of a spent cartridge. In addition, the transmitter/detector assembly and resultant cartridge presence confirmation capability could be incorporated into a wide variety of liquid filtration systems including the two-cartridge system describe in Section 2 above, multiple-cartridge systems, and a variety of other liquid filtration systems. The presence or absence of the filter presence confirmation signal also could be used to control and/or override normal operation of the filtration system. For instance, an electronically- actuated valve could be incorporated into the filtration system and controlled by the microcontroller 560 so as to preclude liquid treatment in the absence of a properly-configured filter cartridge in the filter assembly.

Many other changes and modifications could be made to the invention without departing from the spirit thereof. The scope of these changes will become apparent from the appended claims.

We claim:

1. An assembly comprising:
   (A) a filter cartridge which is adapted for removable connection to a base of a liquid filter assembly; and
   (B) a signal transmitter which is embedded in a portion of said filter cartridge so as to be isolated from fluid flow through said filter cartridge and which is located and configured to transmit a signal indicative of the presence of said filter cartridge in said filter assembly.

2. An assembly as defined in claim 1, wherein said transmitter comprises one of a magnet, an optical reflector, a flux conductor, and an electric switch.

3. An assembly as defined in claim 2, wherein said transmitter comprises a magnet which is embedded in a sealed bore in a post of said filter cartridge and which is configured to generate and transmit a magnetic field which is detectable by a magnetic field detector on said base.

4. An assembly as defined in claim 3, wherein said magnet generates a magnetic field capable of interaction with a reed switch.

5. An assembly as defined in claim 1, wherein said filter cartridge is cylindrical and has an end cap and a tubular post extending axially outwardly from said end cap for mating engagement with said base.

6. An assembly as defined in claim 5, wherein said filter cartridge further comprises a composite carbon block/sediment filter.

7. An assembly as defined in claim 6, wherein said transmitter is positioned within said post.

8. An assembly as defined in claim 5, wherein said transmitter is coupled to said post.

9. An assembly comprising:
   (A) a filter cartridge which is adapted for removable connection to a base of a liquid filter assembly; and
   (B) a signal transmitter which is mounted on said filter cartridge and which is located and configured to transmit a signal indicative of the presence of said filter cartridge in said filter assembly, wherein said filter cartridge is cylindrical and has an end cap and a tubular post extending axially outwardly from said end cap for mating engagement with said base, and wherein said transmitter is embedded in said post.

10. An assembly comprising:
(A) a filter cartridge which is adapted for removable connection to a base of a potable water filter assembly; and
(B) a magnet which is embedded in said filter cartridge so as to be isolated from fluid flow through said filter cartridge and which is located and configured to generate and transmit a magnetic field which is indicative of the presence of said filter cartridge and which is detectable by a magnetic field detector on said base.

11. An assembly comprising:
(A) a filter cartridge which is adapted for removable connection to a base of a potable water filter assembly, said filter cartridge including
(1) a carbon block filter element having first and second opposed axial ends,
(2) a first, imperforate end cap sealing said first end of said filter element,
(3) a second end cap sealing said second end of said filter element, a tubular post being formed integrally with and extending axially outwardly from a body of said second end cap for mating engagement with said base, an orifice being formed axially through the body of said second end cap and into an interior of said post for the flow of water between an interior of said filter element and the interior of said post, a bore being formed in an axial end surface of said post; and
(B) a magnet which is sealingly embedded in said bore of said post and which is configured to generate and transmit a magnetic field which is detectable by a magnetic field detector on said base.

12. An assembly as defined in claim 11, wherein said magnet generates and transmits a magnetic field capable of closing a reed switch.

13. A filter assembly comprising:
(A) a base;
(B) a detector which is mounted on said base;
(C) a filter cartridge which is adapted for removable connection to said base; and
(D) a signal transmitter which is embedded in said filter cartridge so as to be isolated from fluid flow through said filter cartridge and which transmits a signal that is detectable by said detector.

14. A filter assembly as defined in claim 13, wherein said transmitter comprises one of a magnet, an optical reflector, a flux conductor, and an electrical contact.

15. A filter assembly as defined in claim 14, wherein said transmitter comprises a magnet which generates and transmits a magnetic field and said detector comprises a magnetic field detector.

16. A filter assembly as defined in claim 15, wherein said magnetic field detector is a reed switch.

17. A filter assembly as defined in claim 14, wherein
said base includes an upper surface and inner and outer concentric tubular members which extend upwardly from said upper surface to define an annular socket therebetween, wherein
said filter cartridge is cylindrical and has an end cap and a tubular post which extends axially outwardly from said end cap and into said annular socket, wherein said transmitter is coupled to said post, and wherein said detector is coupled to one of said inner and outer concentric tubular members.

18. A filter assembly as defined in claim 14, further comprising a sump which surrounds said filter cartridge and which is removably and sealingly attached to said base.

19. A filter assembly as defined in claim 14, wherein said transmitter and said detector are configured such that said detector is capable of detecting whether or not said filter cartridge is properly configured for use with said base.

20. A filter assembly as defined in claim 19, wherein said transmitter and said detector are capable of detecting whether or not said filter cartridge has at least one of 1) a filtration capacity of above a designated volume and 2) a designated filtration medium.

21. A filter assembly comprising:
(A) a base;
(B) a detector which is mounted on said base;
(C) a filter cartridge which is adapted for removable connection to said base; and
(D) a signal transmitter which is mounted on said filter cartridge and which transmits a signal that is detectable by said detector, wherein
said base includes an upper surface and inner and outer concentric tubular members which extend upwardly from said upper surface to define an annular socket therebetween, wherein
said filter cartridge is cylindrical and has an end cap and a tubular post which extends axially outwardly from said end cap and into said annular socket, wherein
said transmitter is coupled to said post, wherein
said detector is coupled to one of said inner and outer concentric tubular members, and wherein
said transmitter comprises a signal generator which is embedded in said post and said detector is embedded in one of said inner and outer tubular members.

22. A filter assembly comprising:
(A) a base including
(1) an upper surface,
(2) inner and outer concentric tubular members which extend outwardly away from said upper surface to define an annular socket therebetween, and
(3) a detector which is coupled to one of said inner and outer concentric tubular members; and
(B) a filter cartridge which is adapted to receive raw water from said base, to treat said water, and to return treated water to said base, said filter cartridge including
(1) an end cap,
(2) a tubular post which extends axially outwardly from said end cap and into said annular socket, and
(3) a signal generator which is embedded in said post so as to be isolated from fluid flow through said filter cartridge and which generates and transmits a signal that is detectable by said detector, wherein said signal generator and said detector are configured such that said detector is capable of detecting whether or not said filter cartridge is properly configured for use with said base.

23. A filter assembly as defined in claim 22, wherein said signal generator comprises a magnet and said detector comprises a magnetic field detector.

24. A filter assembly as defined in claim 23, wherein said detector is a reed switch.

25. A filter assembly as defined in claim 22, wherein said detector is embedded in one of said inner and outer concentric tubular members.

26. A filtration system comprising:
(A) a filter assembly having a raw liquid inlet and a treated liquid outlet, said filter assembly including
(1) a base,
(2) a detector which is mounted on said base,
(3) a filter cartridge which is configured for removable connection to said base and which is adapted to receive raw liquid from said base, to treat said liquid, and to return treated liquid to said base, and (4) a signal transmitter which is embedded in said filter cartridge so as to be isolated from fluid flow through said filter cartridge and which transmits a signal that is detectable by said detector;

(B) a flow meter which monitors the flow of liquid through said filter assembly; and (C) a computer which receives signals from said detector and from said flow meter and which selectively generates and transmits signals indicative of 1) the presence of said filter cartridge in said filter assembly, and 2) liquid flow through said filter cartridge.

27. A filtration system as defined in claim 26, wherein said transmitter comprises a magnet and said detector comprises a magnetic field detector.

28. A filtration system as defined in claim 27, wherein said detector is a reed switch.

29. A filtration system as defined in claim 26, wherein said flow meter includes (1) a turbine cartridge, (2) a turbine which is made substantially entirely out of a magnetic material and which is rotatably supported in said turbine cartridge, wherein said magnetic material comprises a molded composite material comprising a magnetic powder and mixed with a carrier, and (3) a magnetic field detector which monitors movement of said turbine and which is coupled to said computer.

30. A filtration system as defined in claim 26, wherein said transmitter and said detector are configured such that said detector is capable of detecting whether or not said filter cartridge is properly configured for use with said base.

31. A filtration system as defined in claim 30, wherein said transmitter and said detector are capable of detecting whether or not said filter cartridge has at least one of 1) a filtration capacity of above a designated volume and 2) a designated filtration media.

32. A filtration system as defined in claim 26, wherein said computer selectively generates and transmits signals representative of at least one of 1) aggregate volumetric flow through said turbine cartridge and 2) volumetric flow rate through said turbine cartridge.

33. A potable water filtration system comprising:

(A) a filter assembly having a raw water inlet and a treated water outlet, said filter assembly including (1) a base, (2) a detector mounted on said base, (3) a filter cartridge which is configured for removable connection to said base and which is adapted to receive raw water from said base, to treat said water, and to return treated water to said base, (4) a signal generator which is embedded in said filter cartridge so as to be isolated from fluid flow through said filter cartridge and which generates and transmits a signal that is detectable by said detector, wherein said signal generator and said detector are configured such that said detector is capable of detecting whether or not said filter cartridge is properly configured for use with said base;

(B) a flow meter which monitors the flow of water through said filter assembly; and (C) a computer which receives signals from said detector and from said flow meter and which selectively generates and transmits signals indicative of 1) the presence of said filter cartridge in said filter assembly, and 2) at least one of a) aggregate volumetric flow through said flow meter and 2) volumetric flow rate through said flow meter.

34. A filtration system as defined in claim 33, wherein said signal generator comprises a magnet and said detector comprises a magnetic field detector.

35. A filtration system as defined in claim 34, wherein said detector is a reed switch.

36. A filtration system as defined in claim 33, wherein said flow meter includes (1) a turbine cartridge, (2) a turbine which is made substantially entirely out of a magnetic material and which is rotatably supported in said turbine cartridge, wherein said magnetic material comprises a molded composition material comprising a magnetic powder admixed with a carrier, and (3) a magnetic field detector which monitors movement of said turbine and which is coupled to said computer.

37. A filtration system as defined in claim 33, further comprising an indicator which receives signals from said computer and which at least selectively displays information indicative of 1) water flow through said filter assembly and 2) the presence or absence of said filter cartridge in said filtration system.

38. A filtration system as defined in claim 37, wherein said computer prevents said indicator from displaying information indicative of water flow through said filter assembly unless said detector detects the presence of a filter cartridge in said filtration system which is properly configured for use in said filtration system.

39. A filtration system as defined in claim 38, wherein said indicator has at least one resettable counter, wherein said computer is operable, in combination with said signal generator, to detect the removal of said filter cartridge from said filtration system, and wherein said computer permits counter reset only upon the detection of the removal of said filter cartridge from said filtration system and the subsequent insertion into said filtration system of a filter cartridge that is properly configured for use in said filtration system.

40. A filtration system as defined in claim 33, wherein said signal generator and said detector are capable of detecting whether or not said filter cartridge has at least one of 1) a filtration capacity of above a designated volume and 2) a designated filtration medium.

41. A method comprising:

(A) attaching a filter cartridge to a base of a filtration system;

(B) transmitting a signal 1) from a transmitter which is embedded in said filter cartridge 2) to said base;

(C) receiving said signal at said base; and (D) automatically enabling a function of said filtration system only upon receipt of said signal by said base.

42. A method as defined in claim 41, wherein the transmitting step comprises transmitting at least one of an electrical signal, a constant magnetic signal, a variable magnetic signal and an optical signal.

43. A method as defined in claim 42, wherein the transmitting step comprises generating and transmitting a magnetic signal.

44. A method as defined in claim 43, wherein the detecting step comprises closing a reed switch.

45. A method as defined in claim 43, wherein the detecting step is performed via operation of a Hall effect sensor.

46. A method as defined in claim 41, further comprising monitoring liquid flow through said filtration system and displaying humanly-discernable information indicative of said liquid flow, and altering the displaying in the absence of the receipt of said signal at said base.

47. A method as defined in claim 46, wherein the altering step comprises overriding a flow characteristic display command and displaying a signal requesting filter cartridge installation.

48. A method as defined in claim 46, wherein said humanly-discernable information comprises information indicative of at least one of 1) aggregate volumetric flow through said filtration system and 2) volumetric flow rate through said filtration system.

49. A method as defined in claim 41, further comprising
automatically detecting filter cartridge replacement by detecting the absence of a filter cartridge in said filtration system followed by the detection of the presence of a replacement filter cartridge in said filtration system, and
automatically resetting at least one counter upon detecting filter cartridge replacement.

50. A method as defined in claim 49, wherein the detecting step comprises determining whether or not the replacement filter cartridge is properly configured for use in said filtration system.

51. A method as defined in claim 50, wherein the detecting step comprises detecting whether or not said replacement filter cartridge has at least one of 1) a filtration capacity of above a designated volume and 2) a designated filtration medium.

52. A method comprising:
(A) connecting a filter cartridge to a base of a filtration system so as to permit raw liquid to flow into said filter cartridge from said base and so as to permit treated liquid to flow into said base from said filter cartridge; and
(B) establishing a communication between said filter cartridge and the remainder of said filtration system that enables a determination of whether or not said filter cartridge is properly configured for use with said base, wherein the step of establishing a communication comprises
transmitting a signal from a signal generator, said signal generator being embedded in said filter cartridge to said base so as to be isolated from the fluid flow;
receiving said signal at said base, and
automatically enabling a function of said filtration system only upon receipt of said signal at said base.

53. A method as defined in claim 52, wherein the transmitting step comprises generating and transmitting a magnetic signal.

54. A method as defined in claim 52, further comprising
monitoring liquid flow through said filtration system and displaying humanly-discernable information indicative of said liquid flow, and
altering the display in the absence of the receipt of said signal at said base.

55. A method as defined in claim 54, wherein said humanly-discernable information comprises information indicative of at least one of 1) aggregate volumetric flow through said filtration system and 2) volumetric flow rate through said filtration system.

56. A method as defined in claim 52, wherein the detecting step comprises detecting whether or not said filter cartridge has at least one of 1) a filtration capacity of above a designated volume and 2) a designated filtration medium.

* * * * *